US012789206B2

(12) United States Patent
Kelly

(10) Patent No.: US 12,789,206 B2
(45) Date of Patent: Nov. 10, 2026

(54) SYSTEMS AND METHODS FOR AN ELECTROSTATIC ATOMIZER OF MODERATELY CONDUCTIVE FLUIDS

(71) Applicant: FouRy, Inc., Albuquerque, NM (US)

(72) Inventor: Arnold James Kelly, Princeton Junction, NJ (US)

(73) Assignee: FouRy, Inc., Albuquerque, NM (US)

( * ) Notice: Subject to any disclaimer, the term of this patent is extended or adjusted under 35 U.S.C. 154(b) by 0 days.

(21) Appl. No.: 19/191,823

(22) Filed: Apr. 28, 2025

(65) Prior Publication Data

US 2025/0276336 A1 Sep. 4, 2025

Related U.S. Application Data

(60) Continuation-in-part of application No. 18/437,049, filed on Feb. 8, 2024, now Pat. No. 12,285,775, which (Continued)

(51) Int. Cl.
*B05B 5/053* (2006.01)
*B05B 5/025* (2006.01)
*B05B 5/10* (2006.01)

(52) U.S. Cl.
CPC .......... *B05B 5/0533* (2013.01); *B05B 5/0255* (2013.01); *B05B 5/10* (2013.01)

(58) Field of Classification Search
CPC ........ B05B 5/0533; B05B 5/0255; B05B 5/10
See application file for complete search history.

(56) References Cited

U.S. PATENT DOCUMENTS 4,255,777 A * 3/1981 Kelly .................... B05B 5/0533 361/228
4,581,675 A * 4/1986 Kelly ...................... B05B 5/025 361/228

(Continued)

FOREIGN PATENT DOCUMENTS

EP 2959951 A1 12/2015
JP 2006156276 A 6/2006

OTHER PUBLICATIONS

International Preliminary Report on Patentability—PCT/US2023/029579, Foury, Inc., completed on Nov. 22, 2024, 22 pp. (representing the reissued Report with correction to the Priority Date and the inclusion of annexes).

(Continued)

*Primary Examiner* — Joseph A Greenlund
(74) *Attorney, Agent, or Firm* — Rita C. Chipperson, Esq.; Chipperson Law Group, P.C.

(57) ABSTRACT

An electrostatic atomizer monitors one or more of: an emitter voltage $V_a$ of an emitter electrode in contact with fluent material in a chamber of the electrostatic atomizer, or an aperture voltage ($V_b$) of an aperture of the chamber of the electrostatic atomizer, or an emitter to aperture voltage ($V_a$–$V_b$). The electrostatic atomizer adjusts the emitter voltage $V_a$ and/or the aperture voltage $V_b$ and electrostatically atomizes the fluent material into a charged spray. The charged spray includes a plurality of charged droplets and/or particulates that are characterized by a K factor greater than 0, wherein the K factor is a ratio of electrostatic energy of surface charges ($W_e$) of the droplets in the plurality of charged droplets and surface energy ($W_s$) of the droplets in the plurality of charged droplets.

10 Claims, 13 Drawing Sheets

Related U.S. Application Data is a division of application No. 18/230,506, filed on Aug. 4, 2023, now abandoned.

(60) Provisional application No. 63/395,480, filed on Aug. 5, 2022.

(56) References Cited

U.S. PATENT DOCUMENTS

| | | | | | |
|---|---|---|---|---|---|
| 4,622,118 | A * | 11/1986 | Chimenti | B01D 9/0063 | 210/748.01 |
| 4,624,763 | A * | 11/1986 | Chimenti | B01D 17/06 | 210/243 |
| 4,627,901 | A * | 12/1986 | Ryan | B01D 9/0009 | 210/748.01 |
| 4,629,546 | A * | 12/1986 | Ryan | B03C 5/024 | 204/665 |
| 4,634,510 | A * | 1/1987 | Mintz | B01D 17/045 | 210/748.01 |
| 4,661,226 | A * | 4/1987 | Mintz | B01D 17/06 | 361/228 |
| 5,093,602 | A * | 3/1992 | Kelly | B05B 5/025 | 239/3 |
| 5,378,957 | A * | 1/1995 | Kelly | B05B 5/025 | 239/3 |
| 5,932,011 | A * | 8/1999 | Noakes | B05B 5/0255 | 118/712 |
| 6,206,307 | B1 * | 3/2001 | Kelly | B05B 5/10 | 239/690 |
| 7,567,420 | B2 * | 7/2009 | Kobayashi | B05B 5/057 | 361/228 |
| 11,867,676 | B2 * | 1/2024 | Potyrailo | G01N 33/0006 | |
| 12,285,775 | B2 * | 4/2025 | Kelly | B05B 5/10 | |
| 2003/0160105 | A1 * | 8/2003 | Kelly | B05B 5/025 | 239/3 |
| 2005/0041361 | A1 * | 2/2005 | Perkins | B05B 5/10 | 361/225 |
| 2005/0257515 | A1 * | 11/2005 | Song | B05B 5/008 | 60/202 |
| 2005/0258360 | A1 * | 11/2005 | Whitehouse | B01D 61/00 | 436/140 |
| 2007/0017505 | A1 * | 1/2007 | Lipp | B05B 5/0255 | 128/200.16 |
| 2015/0251213 | A1 * | 9/2015 | Birmingham | G01B 11/24 | 118/621 |
| 2016/0107178 | A1 * | 4/2016 | Velásquez-García | B05B 1/14 | 239/3 |
| 2017/0319797 | A1 | 11/2017 | Germinario et al. | | |
| 2019/0210881 | A1 * | 7/2019 | Tung | B01D 67/0069 | |
| 2020/0115258 | A1 * | 4/2020 | Trembly | C02F 1/4608 | |
| 2020/0261930 | A1 * | 8/2020 | Liu | B01D 1/18 | |
| 2020/0373141 | A1 * | 11/2020 | Perna | F03H 1/0012 | |
| 2021/0283625 | A1 * | 9/2021 | Aono | B05B 5/0536 | |
| 2021/0343960 | A1 * | 11/2021 | Birmingham | B05B 12/084 | |
| 2021/0404594 | A1 * | 12/2021 | Hanson | B82Y 40/00 | |
| 2023/0032992 | A1 * | 2/2023 | Chari | B05D 3/148 | |
| 2023/0416599 | A1 * | 12/2023 | Cannan | C09K 8/805 | |
| 2023/0417375 | A1 * | 12/2023 | Wu | F21K 9/235 | |
| 2024/0042467 | A1 * | 2/2024 | Kelly | B05B 5/0533 | |

OTHER PUBLICATIONS

International Preliminary Report on Patentability—PCT/US2023/029579, Foury, Inc., completed on Sep. 6, 2024, 8 pp. (pp. 1-4 issued on Sep. 10, 2024, and pp. 5-8 are the reissued Report with typographical corrections issued on Nov. 12, 2024, without a change to the Sep. 6, 2024 date of completion).

International Search Report—PCT/US2023/029579, Foury, Inc., dated Dec. 7, 2023.

Written Opinion—PCT/US2023/029579, Foury, Inc., dated Dec. 7, 2023.

* cited by examiner $-\alpha'/\beta' = 4.$ Ry

1200

SYSTEMS AND METHODS FOR AN ELECTROSTATIC ATOMIZER OF MODERATELY CONDUCTIVE FLUIDS

CROSS REFERENCE TO RELATED APPLICATIONS

This application is a U.S. non-provisional continuation-in-part patent application of U.S. patent application Ser. No. 18/437,049, filed Feb. 28, 2024, entitled, "Methods for An Electrostatic Atomizer of Moderately Conductive Fluids," which is a U.S. non-provisional divisional patent application of U.S. patent application Ser. No. 18/230,506, filed Aug. 4, 2023, entitled "Systems and Methods for An Electrostatic Atomizer of Moderately Conductive Fluids," which claims priority under 35 U.S.C. § 119 to U.S. Provisional Application No. 63/395,480 entitled, "Systems and Methods for an Electrostatic Atomizer of Moderately Conductive Fluids," filed Aug. 5, 2022, which are hereby expressly incorporated by reference in their entirety as if fully set forth herein.

FIELD

Embodiments of the present application generally relate to electrostatic atomization of fluids and the charging of fluent matter. More specifically, embodiments of the present application relate to droplet/particulate and charging/spraying for values of the spray droplet characteristic factor K>0, wherein the K factor is the ratio of surface charge energy $W_e$ to the particle surface energy $W_s$.

BACKGROUND

Considerable effort has been devoted to development of methods and apparatus for dispersing fluids. For example, mechanical atomizers, which operate by forcing a fluid to be atomized under high pressure through a fine orifice. Such mechanical atomizers are used in oil burners and as fuel injectors in combustion engines. Other mechanical dispersion devices mix the fluid to be atomized with a gas flowing at high velocity, so that the fluid is dispersed by the kinetic effect of the high velocity gas.

Another dispersion process is atomization of a fluid into droplets. Atomization is employed in industrial processes such as combustion, chemical treatment of fluids, spray coating and spray painting. It is ordinarily desirable in dispersion processes such as atomization to produce a fine, uniform dispersion of the fluid. Thus, in atomization it is desirable to convert the fluid into fine droplets, most desirably droplets of substantially uniform size. In one type of atomization, an electric charge, generally negative, is applied to the fluid by one or more charged electrode pairs.

FIG. 1 illustrates a high level schematic block diagram of one type of electrostatic atomizer 100, referred to commercially as a Charge Injected Precision Spraying®, or ChIPS® atomizer. A pair of opposed electrodes, such as emitter electrode 102 and grounded chamber 104, are positioned immediately upstream of an exit aperture 106. A fluid passes into inlet flow 108 and flows between the pair of opposed electrodes 102, 104 before exiting through aperture 106. The opposed electrodes 102, 104 are maintained under differing electrical potentials by a power supply 112, so that charges leave one of the electrodes, e.g., the submerged emitter electrode 102, and travel towards the opposite electrode 104 (at or near ground) through the fluid. The moving fluid tends to carry the charges downstream, towards the exit aperture

106. Generally, the velocity of the fluid is great enough that most charges in the fluid pass downstream through the exit aperture 106 and do not reach the opposite electrode 104. Thus, a net charge is injected into the fluid by the action of the opposed electrodes 102, 104. Upon exiting the aperture 106, mutual repulsion of the trapped unipolar charges shreds the unconstrained highly charged fluid. A droplet cloud 110 having predictable characteristics is the result. The droplet cloud 110 flows to a grounded surface 114.

Currently, such charge injected, electrostatic atomizer systems are only effective for fluids having relatively low electrical conductivity, typically below 1 microSiemens per meter (1 μS/m). When the electrical conductivity of the fluid is greater than 1 μS/m, it is difficult to maintain a substantial potential difference between the opposed electrodes. Although numerous organic liquids can be successfully atomized by current charge injected atomizers, many other industrially significant materials are too conductive and hence cannot be atomized or dispersed by the current atomizers. For example, typical aqueous solutions of inorganic materials are highly conductive and hence not readily susceptible to electrostatic atomization. These conductive solutions include industrially important materials, such as water-based paints and coatings, comestible materials such as beverage extracts, and agricultural materials such as aqueous fertilizer solutions, herbicide solutions and the like.

Thus, there is a need to extend the operating envelope of current charge injection atomizers to include fluids, such as water, having conductivity levels greater than 1 μS/m. Additional and/or alternative advantages may be present in one or more embodiments described herein.

BRIEF SUMMARY OF THE INVENTION

In at least one aspect, a method of an electrostatic atomizer for electrostatically atomizing a fluent material includes monitoring one or more of: an emitter voltage $V_a$ of an emitter electrode in contact with fluent material in a chamber of the electrostatic atomizer, or an aperture voltage ($V_b$) of an aperture of the chamber of the electrostatic atomizer, or an emitter to aperture voltage ($V_a-V_b$); determining one or more of: the emitter to aperture voltage ($V_a-V_b$), the emitter voltage ($V_a$), or the aperture voltage ($V_b$), are not within respective predetermined thresholds; adjusting the emitter voltage $V_a$ and/or the aperture voltage $V_b$; and electrostatically atomizing the fluid into a charged spray, wherein the charged spray includes a plurality of charged droplets and/or particulates.

In at least another aspect, a method by an electrostatic atomizer for electrostatically atomizing a fluent material includes adjusting an emitter voltage $V_a$ of an emitter electrode in a chamber of the electrostatic atomizer and/or an aperture voltage $V_b$ of a component in contact with the chamber of the electrostatic atomizer; and electrostatically atomizing the fluent material into a charged spray by inserting charge into the fluent material using the emitter to aperture voltage ($V_a-V_b$) as the fluent material flows over the emitter and exits through the aperture of the chamber, wherein the charged spray includes a plurality of charged droplets having a predetermined value of a K factor, wherein the K factor is a ratio of electrostatic energy of surface charges ($W_e$) of the plurality of charged droplets and surface energy ($W_s$) of the plurality of charged droplets.

In one or more of the above aspects, the plurality of droplets and/or particulates in the charged spray are characterized by a K factor greater than 0, wherein the K factor is a ratio of electrostatic energy of surface charges ($W_e$) of the droplets in the plurality of charged droplets and surface energy ($W_s$) of the droplets in the plurality of charged droplets.

In one or more of the above aspects, the plurality of droplets and/or particulates in the charged spray are monodispersed corresponding to a K factor K≥2, wherein the K factor is a ratio of electrostatic energy of surface charges ($W_e$) of the droplets in the plurality of charged droplets and surface energy ($W_s$) of the droplets in the plurality of charged droplets.

In one or more of the above aspects, the plurality of droplets and/or particulates in the charged spray are characterized by a non-zero positive K factor, wherein the K factor is a ratio of electrostatic energy of surface charges ($W_e$) of the droplets in the plurality of charged droplets and surface energy ($W_s$) of the droplets in the plurality of charged droplets.

In one or more of the above aspects, the method further includes flowing the fluent material over the emitter electrode and through the aperture of the chamber; and using the emitter to aperture voltage ($V_a-V_b$) to insert charge into the fluent material as the fluent material flows over the emitter and through the aperture of the chamber and electrostatically atomizes into the charged spray.

In one or more of the above aspects, the method further includes adjusting the emitter voltage $V_a$ and/or the aperture voltage $V_b$ to generate the plurality of droplets and/or particulates in the charged spray having a predetermined value of a K factor, wherein the K factor is a ratio of electrostatic energy of surface charges ($W_e$) of the droplets in the plurality of charged droplets and surface energy ($W_s$) of the droplets in the plurality of charged droplets.

In one or more of the above aspects, adjusting the emitter voltage $V_a$ and/or the aperture voltage $V_b$ comprises one or more of: adjusting a power supply to the emitter electrode to increase or decrease the emitter voltage $V_a$; or adjusting a variable impedance circuit to increase or decrease the aperture voltage $V_b$.

In one or more of the above aspects, $V_a$ and $V_b$ are measured in relation to a third electrode physically separated from both the emitter and the chamber.

In one or more of the above aspects, the third electrode is downstream and collects charges from at least a portion of the plurality of charged droplets.

In one or more of the above aspects, adjusting the emitter voltage $V_a$ and/or the aperture voltage $V_b$ comprises one or more of: adjusting a power supply to the emitter electrode to increase or decrease the emitter voltage $V_a$ with respect to the voltage of the third electrode; or adjusting a variable impedance circuit to increase or decrease the aperture voltage $V_b$ with respect to the voltage of the third electrode.

In one or more of the above aspects, the method further includes obtaining a user input for a mode of operation of the electrostatic atomizer, wherein the mode of operation indicates the predetermined value of the K factor; and adjusting the emitter voltage $V_a$ and/or the aperture voltage $V_b$ based on the mode of operation to obtain the charged spray of the plurality of charged droplets having the predetermined value of the K factor.

In one or more of the above aspects, the predetermined value of the K factor is a non-zero positive value greater than 0 (K>0).

In one or more of the above aspects, the predetermined value of the K factor is greater than 2 (K>2).

In one or more of the above aspects, the predetermined value of the K factor is greater than 0 and less than 1 (0<K<1).

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

As required, a detailed illustrative embodiment of the present invention is disclosed herein. However, techniques, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

In the following description, numerous specific details are set forth to provide a more thorough understanding of the present invention. However, it will be apparent to one of skill in the art that the present invention may be practiced without one or more of these specific details. In other instances, well-known features have not been described to avoid obscuring the present invention. For clarity, embodiments of the present invention are described in terms of conductive fluent material. However, it is contemplated that virtually any fluent material including materials such as non-conductive fluids, and the like, may be used to advantage within the scope of the present invention. In addition, both fluent and non-fluent materials may be produced using the methods and apparatus of the present invention. The fluent materials include one or more substances that flow, including liquids, fluids, solutions, mixtures, amorphous solids, granular materials, etc.

Figure 2:
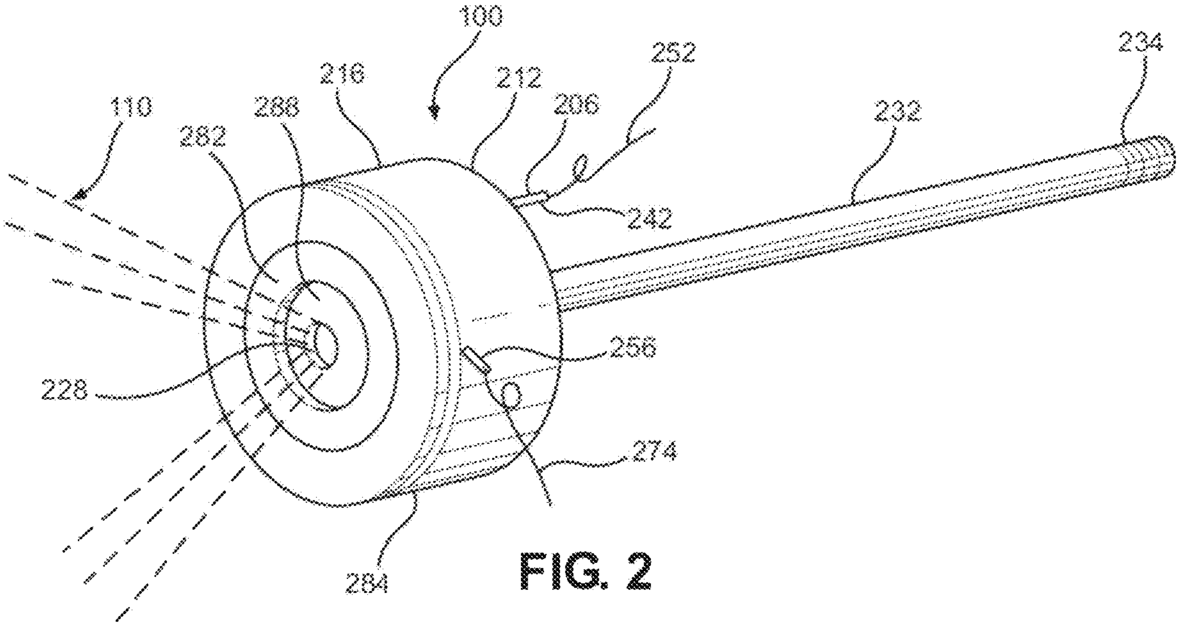
FIG. 2 illustrates a schematic block diagram of an embodiment of an electrostatic atomizer.
Figure 3:
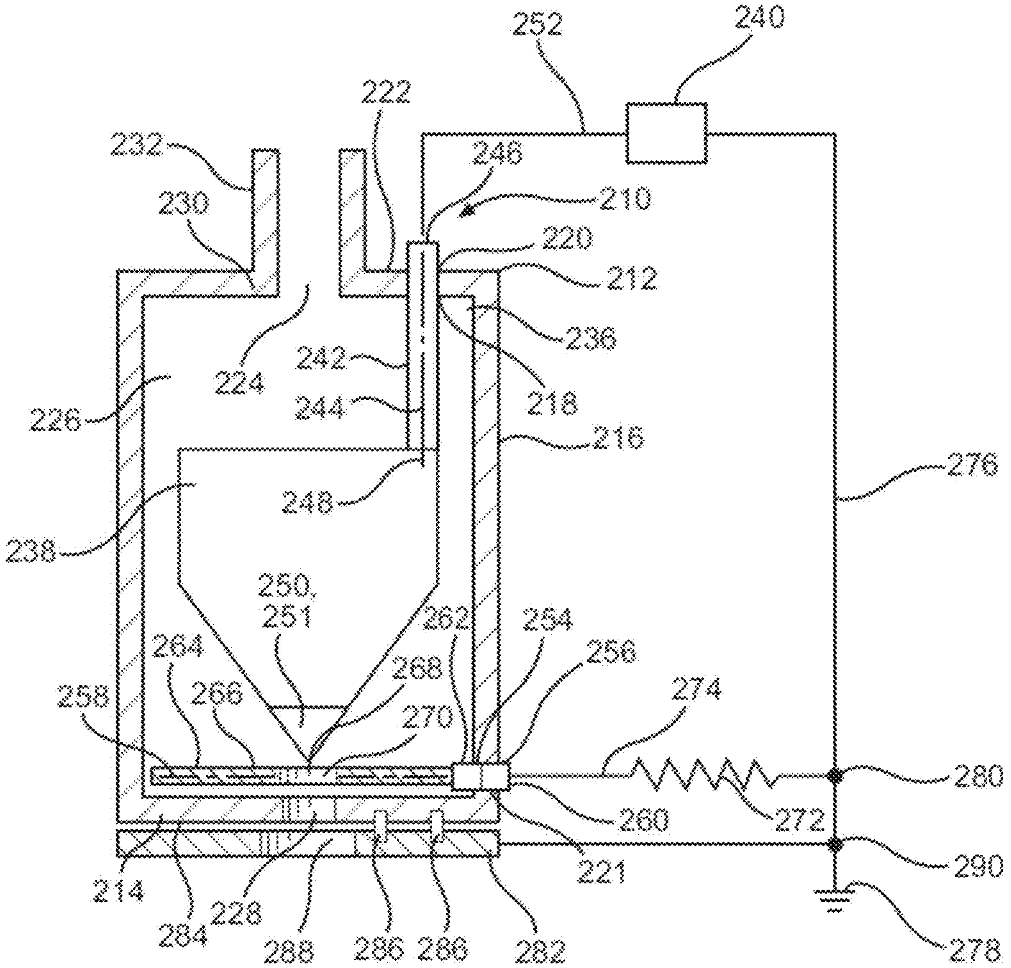
FIG. 3 illustrates a cross-sectional view of an embodiment of the electrostatic atomizer.

FIGS. 2 and 3 illustrate a schematic block diagram of an embodiment of an electrostatic atomizer 100 as described in U.S. Pat. No. 4,255,777, entitled, "Electrostatic Atomizing Device," issued on Mar. 10, 1981, to inventor Arnold J. Kelly, which is hereby incorporated by reference herein (hereinafter the '777 patent). The '777 patent describes an electrostatic atomizer, such as the commercially known Charge Injected Precision Spraying® (ChIPS®) atomizer. The charge injection atomization method involves the direct injection of charge (electrons) into the flowing spray fluid within the spray head and/or immediately prior to the exit port using one or more electrode pairs. The electrostatic atomizer 100 in the '777 patent includes a cylindrically shaped non-conductive housing (cell) 212 (e.g., made of a plastic, such as a Lucite® material) having a base 214, an upwardly extending cylindrically shaped sidewall 216 with a threaded aperture 221 therethrough, a top 222 with a threaded aperture 220 therethrough and a threaded hole 224 therethrough, and a chamber 226 disposed therein, wherein the base 214 has a center discharge opening 228 therethrough which is the discharge spray means. One threaded end 230 of a first cylindrically shaped liquid supply conduit 232 is threadedly received into hole 224, wherein the conduit 232 extends linearly outwardly from the top 222 of the housing 212. The other threaded end 234 of conduit 232 is adapted to be joined to a liquid supply means (not shown) whereby the liquid passes through conduit 232 into chamber 226.

A first non-conductive elongated cylindrically shaped tube 242 having an externally threaded surface 218 and a continuous bore therethrough is threadedly disposed through threaded aperture 220, wherein one end 246 of tube 242 extends outwardly from housing 212 and the other end 248 of tube 242 extends inwardly into an upper portion of chamber 226. A first electrode 238 or a series of first electrodes 238 in parallel or in a parallel series combination is joined into the end 248 of tube 242 by suitable means such as an adhesive cement or the end 248 of tube 242 can be embedded into electrode 238, wherein electrode 238 preferably is a setaceous surface 250 formed from a plurality of pins 251 which are in a substantially parallel alignment within the chamber 226. A setaceous surface is defined as one having a plurality of essentially parallel similar continuous pins having lateral dimensions of order 10 μm, more preferably 1 μm, most preferably 0.1 μm or less in a matrix of non-conductor or semi-conductor material. Each pin is arrayed in a regular or almost regular pattern with mean separation distances of an order of about 35 μm or less. An example of a suitable electrode 238, but not limiting in scope, is a eutectic mixture of uranium oxide and tungsten fibers, e.g., as described in the article, "Unidirectional Solidification Behavior in Refractory Oxide Metal Systems," A. T. Chapman, R. J. Geides, Journal of Crystal Growth Vol. 13/14, p. 765, 771 (1972).

The first electrode 238 is connected in series to a high voltage source 240 which is disposed externally to the housing 212, by means of a first electrical lead wire 252 extending through the bore 244 of tube 242. The high voltage source 240 is wired by means of a ground wire 276 to a ground 278 disposed externally to device 210. A second non-conductive, elongated cylindrically shaped tube 256 (e.g., made of a plastic, such as a Lucite® material) having a continuous bore 258 therethrough is disposed through aperture 221, wherein one end 260 of tube 256 extends outwardly from housing 212 and the other end 262 of tube 256 extends inwardly into a lower portion of chamber 226. A liquid tight seal is formed between tube 256 and sidewall 216 by adhesive or by another sealant means 254.

A second electrode 264 or a series of second electrodes 264 in parallel or in series parallel combination are joined onto end 262 of tube 256 by suitable means such as an adhesive cement or the end 262 of tube 256 can be embedded in electrode 264. The second electrode 264 is a planar shaped disc 266 having at least one center longitudinally aligned aperture 268 therethrough and optionally a plurality more of longitudinally aligned apertures 270 therethrough at prescribed distances from the center aperture 268; alternately a plurality of longitudinally aligned apertures 268 could be used arrayed symmetrically with respect to the center line with no aperture hole on the center line.

The aperture holes could also be skewed to the center line. The second electrode 264 is disposed transversely within chamber 226 below and spaced apart from the first electrode 238. The first electrode 238 can be moved longitudinally upwardly or downwardly thereby reducing or increasing the gap between the electrodes 238, 264 as well as modifying the flow of charge within the liquid. The second electrode 264 is preferably formed, e.g., from platinum, nickel or stainless steel and is wired in series to a high voltage resistor element 272 disposed externally to housing 212 by an electrical lead wire 274 extending through tube 256. The resistor element 272 is connected at its opposite end to ground juncture 280 of the high voltage source 240.

An external annularly shaped electrode 282 (e.g., stainless steel) can be affixed on the external bottom surface 284 of base 214 by adhesive means or by a plurality of anchoring elements 286 extending upwardly through electrode 282 and being embedded into base 214. The center opening 288 of electrode 282 and discharge opening 228 are aligned, wherein opening 228 is preferably less than about 2 cm in diameter, more preferably less than about 1 cm in diameter most preferably less than about 6 mm in diameter, and the diameter of the center opening 88 is less than about 1 mm, more preferably less than about 600 μm, and most preferably less than about 200 μm. In this position, electrode 282 assists the spraying due to the development of the electrostatic field; however, the positioning of electrode 282 at this position is not critical to operation as long as this electrode 282 is disposed externally to housing 212.

The electrode 282 is also connected to a second grounded junction 290 disposed between ground 278 and the first electrical juncture 280. The first electrode 238 is negatively charged wherein the second electrode 264 has a relative positive potential with respect to the first electrode 238 and the external electrode 282 is at ground potential (the positive potential of source 240). In one mode of operation the first electrode 238 is negatively charged and the second electrode 264 and the external electrode 282 are relatively positively charged.

The high voltage source 240 which can be a direct voltage, an alternating voltage, or a pulsed voltage source of either polarity, wherein the source is about 100 volts to about 100 kilovolts, more preferably about 100 volts to about 50 kilovolts DC, and most preferably about 100 volts to about 30 kilovolts DC. The charge induced into the liquid 236 within the chamber 226 results in a flow from the first electrode 238 to the second electrode 264. The liquid within the chamber 226 flows towards the discharge opening 228 of the base 214, wherein the electrical charge which is induced into the liquid within the chamber 226 must be sufficient to generate excess free charge in the liquid within the chamber 226, wherein the charge can be positive or negative. The fluid is emitted outwardly therefrom in a spray configuration, (as a plurality of droplets), wherein the external electrode 282 enhances acceleration of the charged droplets. In an embodiment, the fluid has a conductivity of less than about $10^4$ mho/meter, more preferably less than about $10^{-4}$ mho/meter, and most preferably less than about $10^{-10}$ mho/meter. Another example of an electrostatic dispenser is described in U.S. Pat. No. 8,622,324, entitled, “VOC-less Electrostatic Dispenser,” issued on Jan. 7, 2012, with inventor Arnold J. Kelly.

Figure 1:
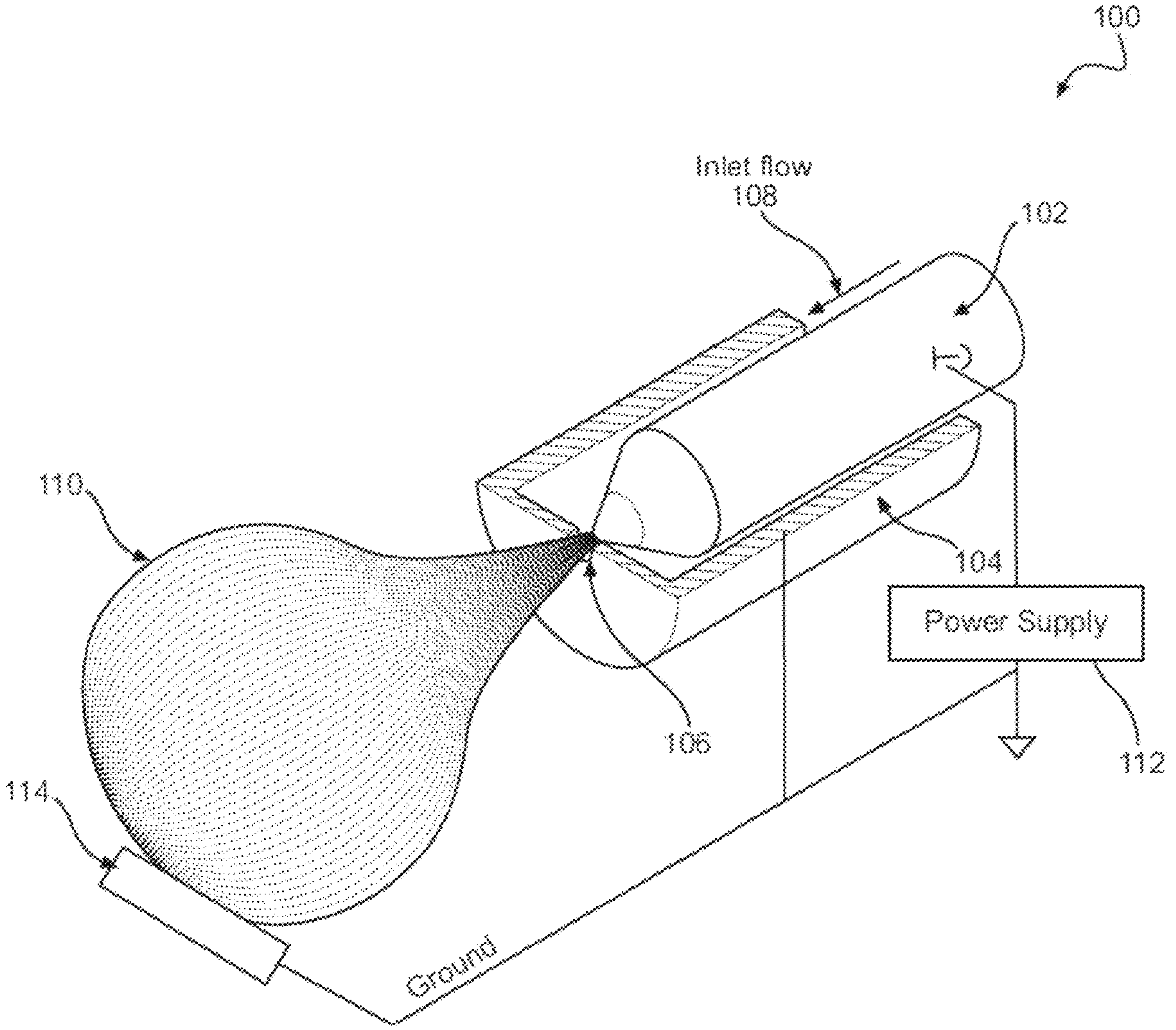
FIG. 1 illustrates a high level schematic block diagram of one type of electrostatic atomizer.

Another embodiment of a charge injection, electrostatic atomizer 100, such as that described in FIGS. 1-3, is the commercially available Spray Triode Atomizer®. The Spray Triode Atomizer® includes a submerged emitter electrode positioned immediately upstream of the exit aperture. For insulating fluids such as oils and fuels, the aperture and case of the charge injection, electrostatic atomizer is grounded. The high voltage emitter electrode is charged to a range of 5-10 kV and is electrically isolated within the atomizer body. The injected fluid is rapidly swept over the emitter and through the aperture to the outside. Mutual repulsion of the trapped unipolar charges shreds the unconstrained, highly charged fluid. A droplet cloud having predictable characteristics is the result.

Oils, fuels, and electrically insulating fluids are particularly well suited for use with the anatomization process of a charge injection, electrostatic atomizer, e.g., such as the Spray Triode Atomizer®. Electrically insulating fluids are characterized by low charge mobility velocity v=μE, wherein μ is the charge mobility (typically p has an order $10^{-7}$) and E is the emitter/aperture electric field strength required for charge injection (typically E is approximately 107 V/m). Charge velocity v in these fluids is therefore on the order of 1 m/sec. In known embodiments, the aperture flow velocity of the injected fluids (e.g., approximately 10 m/s) is generally higher than the charge velocity. As such, most of the injected charge is expelled in the fluid flowing from the electrostatic atomizer. In some instances, greater than 95% of the input charge has been observed as spray current.

This type of charge injection, electrostatic atomizer is extremely efficient in converting bulk fluid into droplet sprays. For instance, only 6 milliwatt (mW) of input injected electrical power is required to generate a 30 μm diameter droplet spray at 1 milliliter per second (mL/s) throughput. By comparison, the hydraulic power required to simply move the fluid through the exit aperture is usually an order of magnitude greater. Thus, in comparison, very little extra power is needed for the emitter electrode of the atomizer.

Currently, these charge injection, electrostatic atomizers described in FIGS. 1-3, such as the Spray Triode Atomizer®, have only efficiently been used for atomization of moderately conductive fluids, e.g., fluids with a conductivity less than 1 microSiemens per meter (1 μS/m). For more conductive fluids having a conductivity greater than 1 μS/n, direct current injection (DCU) or electron beam atomizers, such as the commercially available Spraytron™ electron gun, have been used. Various embodiments of these types of DCI or electron beam atomizers are described in the following: U.S. Pat. No. 5,378,957, entitled, “Electron Beam Dispersal Method,” issued on Jan. 3, 1995 with inventor Arnold J. Kelly; U.S. Pat. No. 5,391,958, entitled, “Electron Beam Window Devices and Methods of Making the Same,” issued on Feb. 21, 1995 with inventor Arnold J. Kelly; and U.S. Pat. No. 5,478,266, entitled, “Beam Window Devices,” issued on Dec. 26, 1995 with inventor Arnold J. Kelly, which are all hereby incorporated by reference herein. These DCI or electron beam atomizers include, e.g., an electron gun for generating a beam of energetic electrons that passes through an electron-permeable membrane and impinges on a fluent material. The electrons impinge on the fluent material as the fluent material flows from the device so that the flow of the fluid material carries the charged portions away from the device.

In contrast, the current charge injection, electrostatic atomizers, e.g., as shown in FIGS. 1-3, are typically only used for spraying low conductivity fluids. For example, the current electrostatic atomizers are specifically designed for optimal operation with the chamber 104 and thus the aperture 106 at grounded or at a minimal voltage (e.g., at 10 V or less) and the emitter 102 at voltages in the 5-10 kV range. At this emitter to aperture voltage range of 5-10 kV range, operation with moderately conductive fluids, such as deionized, distilled and tap water, requires unacceptably high flow velocities, high pumping powers and feeding pressures.

However, due to the efficiency and simplicity of charge injection, electrostatic type atomizers, it would be advantageous to extend the operating envelope of such atomizers to include fluids such as saline water having conductivity levels greater than 1 S/m. Conceptually, if the aperture flow velocity is sufficiently high, these electrostatic type atomizers are capable of charge injecting any fluid; the charge mobility velocity must be comparable to, or lower than, the aperture flow velocity of the fluid. This may be marginally feasible for de-ionized (DI), distilled water and some low conductivity tap waters. However, more conductive fluids (greater than approximately VS/m or greater than approximately 1 mS/m) would require exorbitantly high pumping power which leads to correspondingly low operating efficiency, and so are not economically feasible. Thus, an electrostatic atomizer capable of atomizing fluids having conductivity levels greater than 1 μS/m without unacceptably high flow velocities and exorbitant pumping power has been a long felt but unmet need in the industry.

Figure 4:
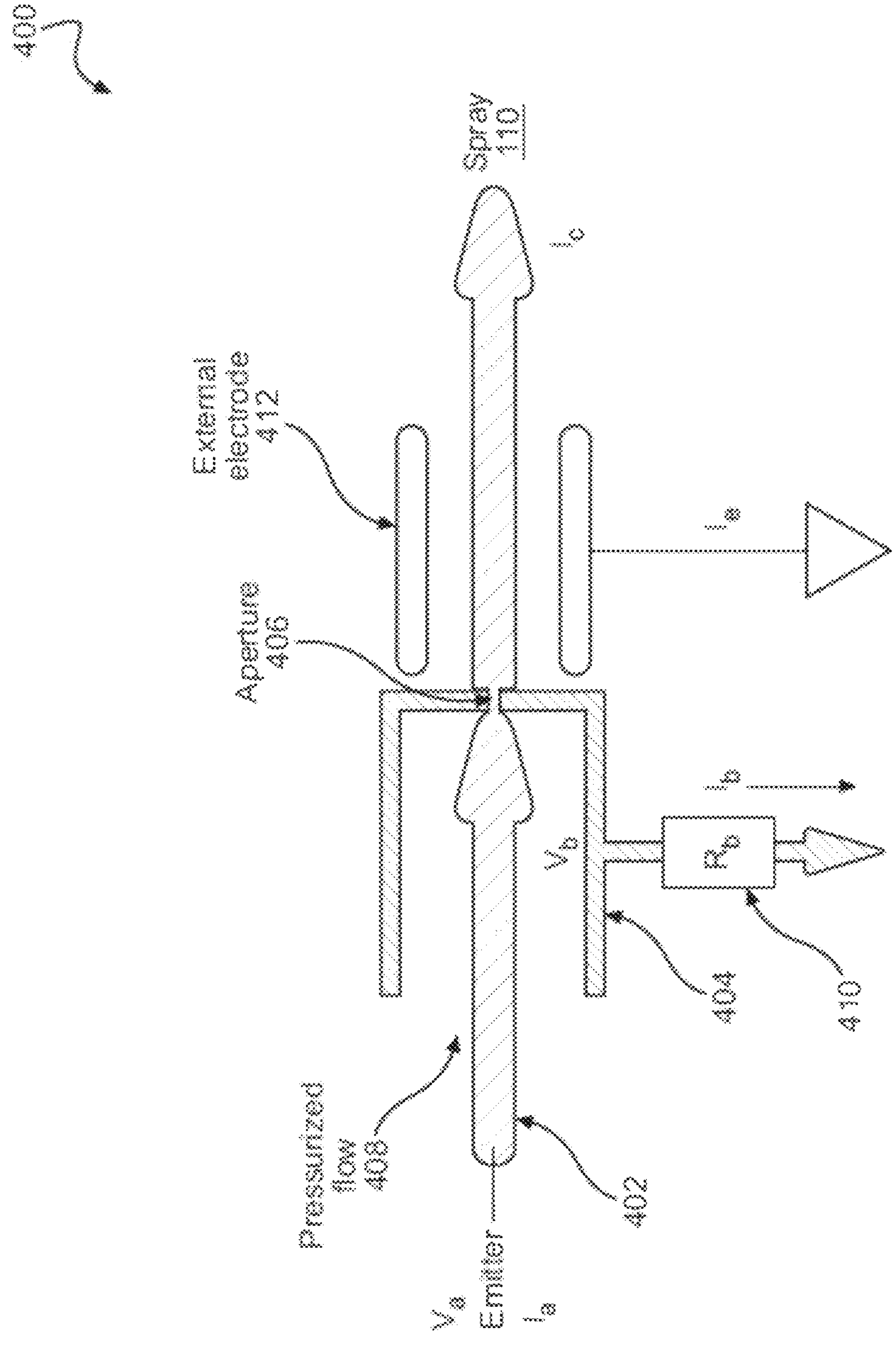
FIG. 4 illustrates a high-level schematic block diagram of a modified charge injection, electrostatic atomizer for atomization of moderately conductive fluids in accordance with the present invention.

FIG. 4 illustrates a high-level schematic block diagram of a modified charge injection, electrostatic atomizer 400 for atomization of fluent material, including moderately conductive fluent material, such as fluids (greater than 1 μS/n). The modified electrostatic atomizer 400 includes a submerged emitter 402 that forms a first electrode and a fluid chamber 404 that forms a second electrode, e.g., as described with respect to the atomizer shown in FIGS. 1-3. The fluid chamber 404 forms and/or includes an aperture 406 that is at or near the voltage of the fluid chamber 404. The emitter 402 injects a charge into the fluent material as it flows through the chamber 404. The fluent material is discharged from the aperture 406 and forms a charged plume of droplets and/or particulates. The droplets include small, suspended liquid particles, while particulates encompass both solid and liquid particles, including droplets, which are suspended, at least temporarily, in the air. In addition, in some embodiments, a second external electrode pair 412 is implemented externally to the aperture 406 to accelerate the atomized droplets exiting from the aperture 406.

It was found in unexpected results that when the second electrode formed by the chamber 404 and/or aperture 406 (or electrode or other component coupled thereto) is maintained at an elevated voltage, e.g. rather than at or near ground as with current charge injection, electrostatic atomizers, it is possible to meet the required thresholds for the emitter to aperture voltage, and effectively atomize moderately conductive fluent materials, including fluids, cost effectively without unacceptably high flow velocities.

In one embodiment, an impedance circuit 410 is implemented in series with the electrode 404 to generate a voltage $V_b$ at chamber 404 (and so also at the exit aperture 406), wherein the voltage $V_b$ equals the current $I_b$ times the impedance Rb. The emitter electrode 402 is charged to a first voltage $V_a$ while the second voltage $V_b$ at the chamber 404/aperture 406 is at an elevated voltage, such that the emitter to aperture voltage $V_a$–$V_b$ equals at least a minimum voltage threshold. Successful spray generation to atomize moderately conductive fluids requires that the emitter to aperture voltage $V_a$–$V_b$ exceeds a minimum voltage, wherein the minimum voltage may be set to obtain a preferred droplet diameter. For example, the minimum voltage may be set to approximately 400 V to produce droplets with 10 μm diameters or may be set to approximately 3300 V for droplets with 100 μm diameters. In one embodiment, the operating voltage $V_b$ of the chamber 404 and/or aperture 406 is in a range of 1 to 100 KiloVolts (KV). In another embodiment, the operating voltage $V_b$ of the chamber 404 and/or aperture 406 is 100 to 500 Volts below the input voltage $V_a$.

In one embodiment, the impedance circuit 410 includes at least one resistor Rb, wherein Rb is approximately 400 MegaOhms (MΩ). Alternative or additional impedance circuits may be implemented to obtain a minimum aperture voltage $V_b$ needed for the desired droplet diameter for the fluid. For example, pulsed or dynamically variable operation and/or use of an AC current can involve an inductive and/or capacitive and/or variable impedance circuit 410 to generate the appropriate voltage differential. Assuming that the current carried away from the atomizer 400 by the fluid flow is termed the spray current, $I_S$, and the current that passes through the liquid to the chamber 404/aperture 406 is the leakage current, $I_L$, then the second voltage $V_b$ at the chamber 404/aperture 406 may be determined as follows:

$$V_b=I_L*R_b$$

So rather than the chamber/aperture voltage $V_b$ being at or near ground as in known charge injection, electrostatic atomizers, the modified electrostatic atomizer 400 exhibits a chamber/aperture voltage $V_b$ equal to the leakage current $I_L$ times the impedance $R_b$. In one embodiment, the operating voltage $V_b$ of the chamber 404 and/or aperture 406 is in a range of 1 to 100 KiloVolts (KV). In another embodiment, the operating voltage $V_b$ of the chamber 404 and/or aperture 406 is 100 to 500 Volts below the input voltage $V_a$.

Figure 5:
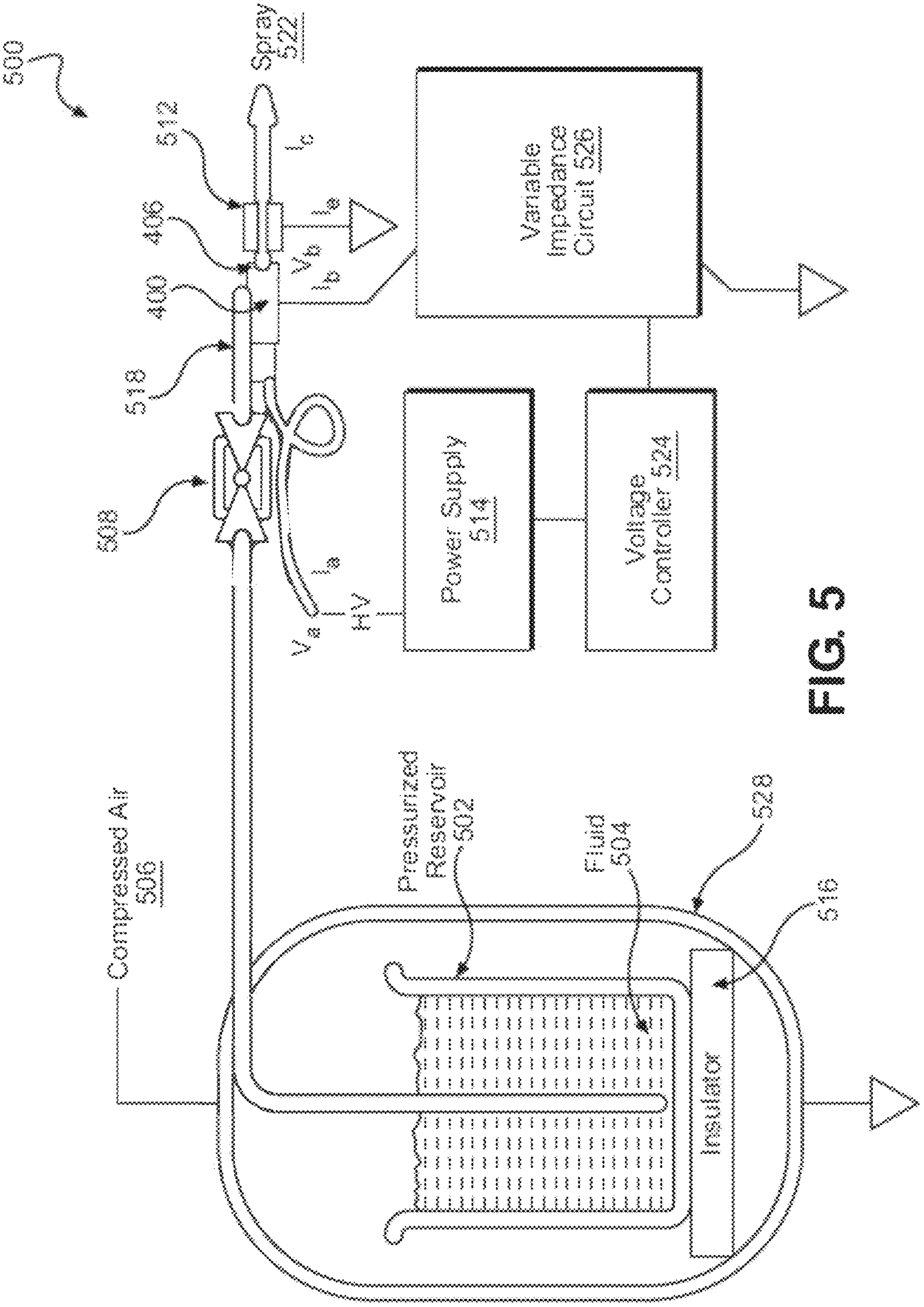
FIG. 5 illustrates a schematic block diagram of an embodiment of an exemplary system for the modified charge injection, electrostatic atomizer in accordance with the present invention.

FIG. 5 illustrates a schematic block diagram of an embodiment of an exemplary system 500 for the modified charge injection, electrostatic atomizer 400. The system 500 includes, for example, a pressurized reservoir 502 for storing pressurized fluid 504. Compressed air 506, e.g., from a pressurized air tank, may be introduced into the reservoir 502 through an inlet to pressurize the fluid 504. The pressurized reservoir 502 includes an electrical insulator 516 to electrically isolate the conductive fluid 504 from the grounded pressure vessel 528. Additionally and/or alternatively, a fluid pump may be implemented to pump the fluid through the modified electrostatic atomizer 400.

The fluid 504 is introduced into the modified electrostatic atomizer 400 using a valve 508, such as an inline slide valve or other type of valve, and an inlet 518. The power supply 514 energizes the emitter electrode 402 in the fluid chamber 404 of the modified electrostatic atomizer 400. When energized, the emitter electrode 402 electrostatically charges the pressurized fluid 504 in the chamber 404 as it flows through the fluid chamber 404 and exits through the aperture 406. That is, the fluid 504, under pressure, exits reservoir 502 and enters the chamber 404 of the modified electrostatic atomizer 400 through valve 508 and fluid inlet 518. The fluid 504 flows past the emitter electrode 402 and then flows out of the chamber 404 through aperture 406. As the fluid 504 passes through the chamber 404, it becomes electrically charged and subsequently atomizes and self-disperses into a plume or spray 522 of charged droplets after exiting the modified electrostatic atomizer 400. An external electrode pair 512 may accelerate the electrically charged and atomized droplets exiting from the aperture 406.

In this embodiment, a voltage controller 524 monitors the emitter voltage $V_a$ and the aperture voltage $V_b$. Though $V_b$ is described as the aperture voltage, other components or elements of the electrostatic atomizer 400 in contact with the aperture 406 may also be at the same or substantially similar voltage $V_b$, and monitored instead, e.g., such as the chamber walls 404, an electrode coupled to the chamber base around the aperture or other components. When the emitter to chamber/aperture difference $V_a$–$V_b$ falls below a minimum voltage threshold $V_T$ or above a maximum voltage threshold $V_M$, the voltage controller 524 adjusts the emitter voltage $V_a$ or the aperture voltage $V_b$ or a combination thereof. For example, the voltage controller 524 may adjust the variable impedance circuit 526 to increase or decrease the impedance $R_b$ and thus, increase or decrease the chamber/aperture voltage $V_b$. Additionally and/or alternatively, the voltage controller 524 may increase or decrease the emitter voltage $V_a$ (e.g., increase or decrease the input current $I_a$ from the power supply).

Using this system 500, the modified electrostatic atomizer 400 may atomize moderately to highly conductive fluids with conductivity greater than 1 μS/m without undue aperture flow velocities. However, operation of the modified electrostatic atomizer 400 is not constrained thereto. The modified electrostatic atomizer 400 may also atomize fluids with low conductivity, such as fluids having conductivity of 1 μS/m or less than 1 μS/m.

Figure 6:
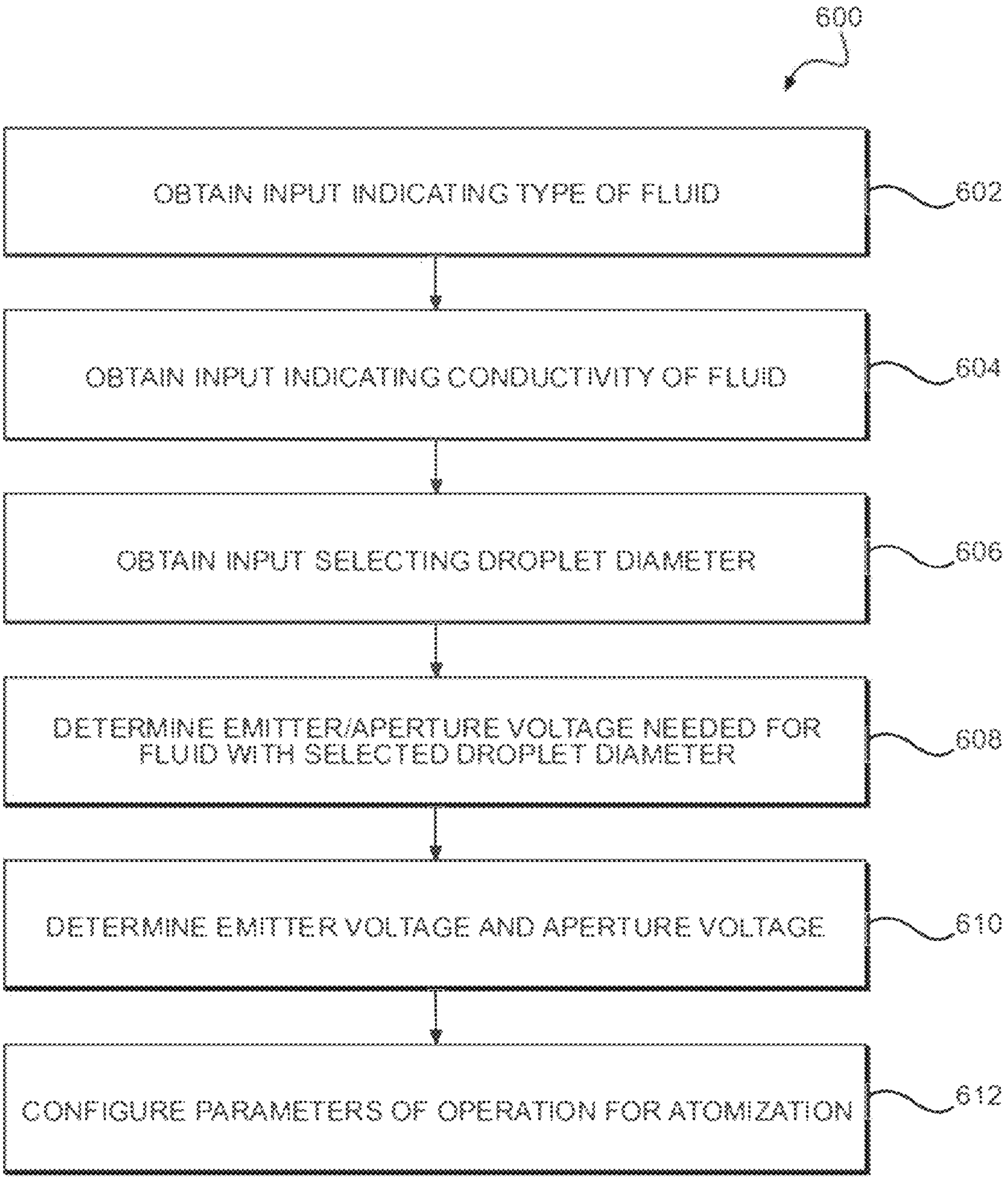
FIG. 6 illustrates a flow diagram of an exemplary embodiment of a method for configuration of the system in accordance with the present invention.

FIG. 6 illustrates a flow diagram of an exemplary embodiment of a method 600 for configuration of the system 500 in accordance with embodiments of the invention. The method 600 may start at step 602, for example, by obtaining user input indicating a type of fluid, such as water, saline water, tap water, deionized water, paint, fuel, oils, etc. At step 604, the system 500 obtains input indicating the conductivity of the fluid. The input may be within a wide range of conductivities, such as equal to or less than 1 μS/m or above 1 μS/M. In another embodiment, the selection may be more exact, such as a manual input of an approximate conductivity of the fluid or a selection of various fluids may be presented with predetermined conductivities. In another embodiment, the system 500 may include a conductivity sensor that determines an approximate conductivity of the fluid. For example, the conductivity sensor may be implemented in the pressurized reservoir 502 or in the chamber 404 of the atomizer 400 and be configured to measure the conductivity of the fluid prior to charging the emitter 402. In another embodiment, the system 500 may determine an approximate conductivity or a range of conductivity of the fluid from the indicated type of fluid. At step 606, the system 500 obtains input indicating a selection of a droplet diameter. The selection may be within a subjective range of small, medium, or large or the user input may include a more precise selection of a specific diameter (10 μm) or in a range of diameters (9 μm-11 μm).

At step 608, the emitter to chamber/aperture voltage ($V_a$–$V_b$) range is determined such that the modified electrostatic atomizer 400 generates the selected droplet diameter for the indicated type of fluid. To achieve the emitter to chamber/aperture voltage ($V_a$–$V_b$), both the voltage of the emitter $V_a$ and the voltage of the chamber/aperture $V_b$ are determined at 610. For example, the emitter voltage $V_a$ may be set to operate within a first predetermined voltage range while the chamber/aperture voltage $V_b$ may be set to operate in a second predetermined voltage range, such that the emitter to chamber/aperture voltage $V_a$–VT is maintained at a minimum voltage threshold or within a predetermined voltage range.

In one embodiment, the minimum emitter to chamber/aperture voltage ($V_a$–$V_b$) threshold may be set to approximately 400 V for generation of 10 μm diameter droplets of water to approximately 3300 V for generation of 100 μm diameter droplets of water. The article, "Low Charge Density Electrostatic Atomization," by A. J. Kelly, IEEE Transactions on Industry Applications, Vol IA-20, No. 2, March/April 1984, Equation 21 reveals the existence of a characteristic voltage related to droplet size, but not how it is related to atomizer characteristics and configurations. Recently concluded experiments, in unexpected results, found that for de-ionized water, distilled water, and tap water, the emitter to aperture voltage ($V_a$–$V_b$) of 400 V and 3300 V resulted in these approximate diameters of 10 um and 100 um, respectively. Note that these crucial voltage differentials is trivially satisfied during atomizer operation with low conductivity fluids, such as fuels and oils, but as discussed, must be carefully provided for with more conductive fluids, such as water.

The parameters of operation of the atomizer system 500 are then configured at 612. The configuration may be done automatically by the atomizer system 500 based on the user input. In another embodiment, the parameters of operation of the atomizer system 500 may be configured manually, e.g., without user input of the type of fluid, conductivity, and/or droplet diameter.

Figure 7:
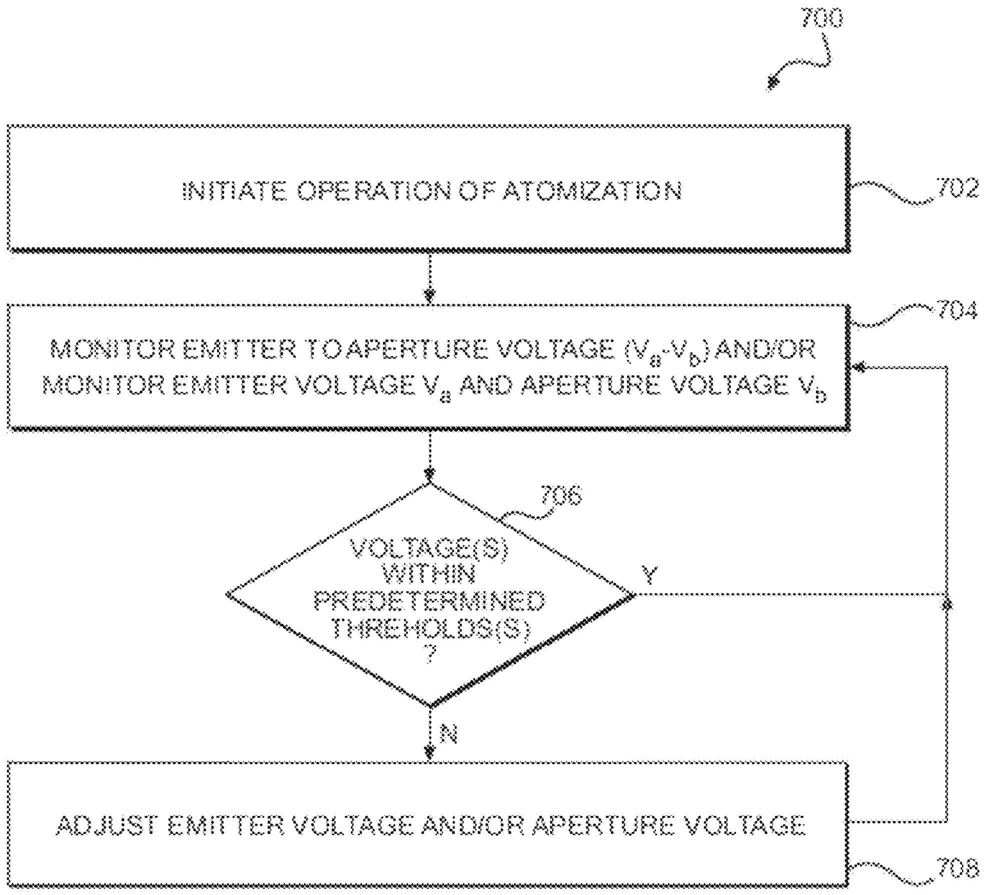
FIG. 7 illustrates a flow diagram of an exemplary embodiment of a method of operation of the atomizer system in accordance with the present invention.

FIG. 7 illustrates a flow diagram of an exemplary embodiment of a method 700 of operation of the atomizer system 500 in accordance with embodiments of the invention. Upon initiation of operation at 702, the emitter to chamber/aperture voltage ($V_a$–$V_b$) is monitored at 704. Alternatively and/or additionally, the chamber/aperture voltage $V_b$ and the emitter voltage $V_a$ are monitored individually. When one or more of the emitter to chamber/aperture voltage ($V_a$–$V_b$), the emitter voltage $V_a$, and/or the chamber/aperture voltage $V_b$ are not within set predetermined voltage thresholds or range at 706, the emitter voltage $V_a$ and/or the chamber/aperture voltage $V_b$ is adjusted at 708. For example, when the emitter to chamber/aperture voltage ($V_a$–$V_b$) falls below a minimum voltage threshold V-r or above a maximum voltage threshold $V_M$, the emitter voltage $V_a$ or the chamber/aperture voltage $V_b$ or a combination thereof may be adjusted. For example, the power supply current $I_a$ may be increased or decreased to the emitter electrode 402 to increase or decrease the emitter voltage $V_a$. Or the variable impedance circuit 526 may be adjusted to increase or decrease the chamber/aperture voltage $V_b$. Or a combination of these actions may be performed.

The monitoring of the voltages continues at 704 during operation of the modified electrostatic atomizer 400, and the emitter voltage $V_a$ or the chamber/aperture voltage $V_b$ may be adjusted further to maintain the predetermined emitter to chamber/aperture voltage ($V_a$–$V_b$) threshold or range. The monitoring may be continuous or at periodic intervals.

The atomizer system 500 thus adjusts a voltage of the emitter $V_a$ and/or the chamber/aperture $V_b$ to maintain the emitter to chamber/aperture voltage ($V_a$–$V_b$) at or above a minimum threshold $V_T$ or within a predetermined voltage range. By maintaining the emitter to chamber/aperture voltage ($V_a$–$V_b$), successful and efficient spray generation is possible of moderately to highly conductive fluids with a conductivity of 1 μS/m or more, as well as fluids with lower conductivity of less than 1 μS/m.

Figure 8:
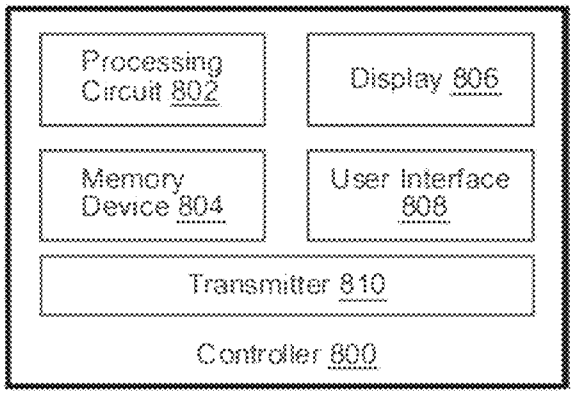
FIG. 8 illustrates a schematic block diagram of a controller for the atomizer system in accordance with the present invention.

FIG. 8 illustrates a schematic block diagram of a controller 800 for the atomizer system 500 in accordance with embodiments of the invention. In an embodiment, the atomizer system 500 may include the controller 800 to control one or more functions, such as obtaining user input of parameters, the configuration of the atomizer 400, the initiation of the atomization process, etc. The controller 800 may be implemented as part of the modified electrostatic atomizer 400 or may be a separate remote control or may be implemented as an application on a user device, such as a smart phone, computer, etc.

The controller 800 includes a processing circuit 802 and memory device 804. The processing circuit 802 includes at least one processor, such as a central processor unit (CPU), microprocessor, microcontroller, embedded processor, digital signal processor, media processor, field programmable gate array, programmable logic device, state machine, logic circuitry, analog circuitry, digital circuitry, and/or any device that manipulates signals (analog and/or digital) based on hard coding of the circuitry and/or operational instructions.

The memory device 804 is a non-transitory memory and may be an internal memory or an external memory, and may be a single memory or a plurality of memories. The memory device 804 may be a read-only memory, random access memory, volatile memory, non-volatile memory, static memory, dynamic memory, flash memory, cache memory, and/or any non-transitory memory device that stores digital information. The memory device 804 stores computer-executable instructions which when executed by the processing circuit 802 causes the atomizer system 500 to perform one or more functions described herein. Computer-executable instructions may include, e.g., program modules such as routines, programs, objects, components, data structures, etc. that perform particular tasks or implement particular abstract data types. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

The controller 800 may further include a display or touch screen that displays the system parameters, settings, operational status, etc. Additional user interfaces 808 may include buttons, dials, keyboard, mouse, touchpad, or other user input devices. A transmitter 810 may include a wireless and/or wireline transmitter to control and is configured to communicate with the atomizer system 500.

Electrostatic Atomization Theory

Electrostatic atomization enables the electronic control of fuel droplet size and dispersion. The mean droplet size will be determined solely by the free charge density $\rho=Q/V$, Coulombs per volume ($C/m^3$) of a droplet of the fluid. Droplet diameter is independent of other properties, e.g., such as the fluid properties of conductivity, density, viscosity, temperature, background conditions (such as pressure, temperature, humidity), and fluid dynamic effects (such as fluid velocity and flow rate). In general, electrostatic sprays, independent of source, will self-organize such that each droplet surface charge is exceptionally energetic (~55 electron-volt (eV))—an energy level approximately twenty times larger than that associated with chemical or fluid dynamic processes (2 to 3 eV).

The inference that electrostatic spraying is a meso-scale quantum-mechanical process is bolstered by the fact that the energy level of 55 eV is within about 1% of 4 Rydberg unit of energy (Ry), wherein 4 Ry=54.4 eV. Additionally, and more convincingly, using available data, such as in the article by A. J. Kelly, entitled, "Low Charge Density Electrostatic Atomization," IEEE Industry Applications, 1-A, 20, pp. 267-273, 1984, spanning greater than three orders of magnitude in charging level (ultimately expanded to ~7 orders of magnitude for disparate liquids), droplet diameter (d) is, with <5% uncertainty, simply related to the number of surface charges (Ne), wherein:

$d=N_e a_0$, wherein $a_0$ is the first Bohr radius $5.29\ 10^{-11}$ m. These close correspondences are unlikely to be coincidental. Subsequent work has validated the quantum-mechanical nature of electrostatic sprays. Numerically, droplet diameter (d) is related to the charge density $\rho$ ($C/m^3$).

Independent of the process for generation of charged sprays, be it with a charge injected atomizer, electron beam DCI injection atomizer, or by simple diode/capillary sprayers, certain fundamental principles apply to the charged sprays. Plume behavior is either dominated by surface tension (the Rayleigh regime) or by the droplet surface electric field (the emission limited regime). Sprays generated in the immediate vicinity of the boundary between the two regimes are not surprisingly more complex.

The Rayleigh regime, dominated by surface tension, is characterized by the K factor, wherein $K=W_e/W_s$, the ratio of the total electrostatic energy of the surface charges ($W_e$) and the surface tension energy ($W_s$). The electrostatic energy of the surface charges $W_e$ of the droplet are generated by the atomization process. The surface energy $W_s$ is the surface tension responsible for maintaining the minimum energy spherical shape of the droplet. In the Rayleigh regime, the K factor is less than 1 (K<1), and the outwardly directed, surface charge forces $W_e$ are in direct competition and less than the inwardly directed surface tension $W_s$.

When the K factor is unity (K=1), for instance as will occur during evaporation (surface charge does not evaporate), the electrostatic energy of the surface charges $W_e$ and the surface tension $W_s$ are equal, and the droplet disrupts. Another way of visualizing this is to consider the balance of surface forces. When the inward surface tension force is just balanced by the outward electrostatic force, the droplet is unconstrained and subject to instability. Observations of evaporating charge droplets and detailed analysis reveal that the droplet literally explodes. This so-called Rayleigh or Coulomb bursting gives birth to upwards of ten very much smaller "daughter" droplets that carry away about a quarter of the parent droplet's charge, and about five percent of its mass. What's left of the original droplet has been observed to undergo this process numerous (upwards of seven) times.

When the K factor is greater than one (K>1), the droplet is sufficiently small so that it cannot be disrupted by the electro-static forces. Droplet charging is now completely controlled by the droplet surface electric field $E_s$. This field limits the droplet from acquiring additional charge.

The surface electric field $E_s$ uniquely defines the Rayleigh/emission spray regime boundary. That is, when the K factor equals one (K=1), the droplet surface electric field $E_s$ is the dominant, controlling factor limiting charging of smaller droplets and defining the 4 Ry energy of the surface electrons in the large droplet Rayleigh spraying regime. As noted, in the surface tension dominated, Rayleigh regime (K<1), each surface electron is exceptionally energetic (4 Ry). Whereas, in the electrostatically dominated (K>1) regime the droplet charge energy is at best a half, and most probably a quarter of this level. The question is: Where does the K=1 demarcation occur, and by extension what parameters define the droplet surface electric field $E_s$? Note that the Rayleigh/emission regime boundary is defined by two distinct processes. Heretofore, the boundary has been defined solely as a particle-centric process—the equality of two forces acting on a surface charge: the inwardly directed surface tension force and the outwardly directed electrostatic repulsive force. But it is equally valid to also define the boundary in terms of the equality of the overall, global system energy, the K=1 condition.

When (K≥1), liquid droplets are sufficiently small so that surface tension forces dominate. This is generally true for solid particulates, which resist fracturing by electrostatic forces. When K≥1, droplet charging is dominated by the droplet surface electric field $E_s$ defined as:

$$E_s=(4\pi a_0/q)\gamma,$$

wherein $a_0$ is the first Bohr radius q is the elemental charge, and $\gamma$ is the surface tension Numerically, the droplet surface electric field $E_s$ (GV/m)=4.12 γ (N/in), and the corresponding droplet diameter ($d_x$) at the boundary of the Rayleigh and emission-limited regimes $$d_x(\mu m) = 0.0524/\gamma,$$

wherein

γ is the surface tension

For typical hydrocarbon liquids, the surface tension γ is approximately 0.03, the droplet surface electric field $E_s$ is approximately 0.13 GV/m and the droplet diameter $d_x$ is approximately 1.7 μm. For water, the surface tension γ is approximately 0.08, the droplet surface electric field $E_s$ is approximately 0.3 GV/m, and the droplet diameter $d_x$ is approximately 0.9 μm. The corresponding values for molten Woods metal: the surface tension γ is approximately 0.45, the droplet surface electric field $E_s$ is approximately 1.85 GV/m, and the droplet diameter $d_x$ is approximately 0.012 μm.

Rayleigh regime and emission-limited charged sprays are fundamentally different. In the surface tension dominated Rayleigh regime (K≤1), each surface electron is exceptionally energetic (−α'/β'=4 Ry, where 1 Ry=13.6 eV). Whereas, in the electrostatically dominated (K>1) regime the droplet charge energy is at best a half (−α'/β'=2 Ry), and most probably a quarter of this level (reference Weis thesis). This regime is characterized by melting of the Rayleigh limit surface electron crystal.

The two electrostatic spray regimes, e.g., the surface tension dominated, Rayleigh regime (K≤1) and the emission-limited regime (K≥1), represent two distinct aspects of droplet surface charge collective behavior. The first clue to the nature of these states is the prediction that droplet charging undergoes a first order charging phase transition at the K=1 boundary. (cf. A. J. Kelly, "Low Charge Density Electrostatic Atomization," IEEE Industry Applications, 1-A, 20, pp. 267-273, 1984).

Charge Crystallization

The two electrostatic spray regimes, e.g., the surface tension dominated, Rayleigh regime (K≤1) and the electrostatically dominated, emission limited regime (K≥1, $d<d_x$), can be visualized as representing two distinct aspects of the collective behavior of the droplet surface charges. A clue to the nature of these states is the prediction that droplet charging undergoes a first order charging phase transition at the K=1 boundary. See, e.g., the article by A. J. Kelly, "Low Charge Density Electrostatic Atomization," IEEE Industry Applications, 1-A, 20, pp. 267-273, 1984.

A new theory of the charge energetics between the two regimes is proposed herein. In this theory, the droplet surface charges in the Rayleigh regime (K≤1) form a crystalline structure. That is, the surface charges are dominated by collective quantum-dynamic effects to form a rigid structure, a spherical crystalline cage structure. This inference is supported by the spray data. It explains why droplet diameter is solely determined by injected charge density. If droplet size is determined by the crystalline cage structure, then the anchoring liquid is irrelevant to the droplet formation process. It also explains why the first principles model of Rayleigh/Coulomb bursting comporting with available data requires surface charge immobility. See, e.g., the article by D. G. Roth, A. J Kelly, "Analysis of the Disruption of Evaporating Charged Droplets," IEEE Industry Applications, 1-A, 19, pp. 771-775, 1983.

The K=1 boundary condition is also compatible with the theory of a crystalline cage structure. At the K=1 boundary, the crystalline cage structure melts due to zero-point energy overcoming the strength of the crystalline structure. Droplet surface charges in the emission limited regime (K>1) become a liquid or gas and are free to skitter around the surface. This theory thus postulates that the surface charges of droplets formed in the surface tension dominated Rayleigh regime (K<1) are a new state of matter, a spherical Fermionic crystal. The crystalline structure formed by the surface charges melt at the K=1 boundary and become a liquid or gas in the emission limited regime (K>1).

During experimentation, depending on the spray fluid surface tension, the droplet surface charges in the Rayleigh regime (K<1) form the crystalline structure for spray droplet sizes larger than about 0.1 micron. Specifically, the crystalline structure exists for a mean droplet size $d_x>0.0525/\gamma$, where γ is the surface tension.

The theory of a crystalline structure of droplet surface charges (K<1) thus provides an explanation for droplet diameter being solely determined by injected charge density in the Rayleigh/Coulomb regime (K<1).

Embodiment of Disinfectant/Sanitizing Spray

Sprays generated by the unmodified charge injection atomizers (FIGS. 1-3) or the modified charge injection atomizers (FIGS. 4-8) operating in the Rayleigh regime (K<1) are effective in killing bacteria. For example, in the article by Pyrgiotakis, G., Vedantam, P., Cirenza, C. e al., "Optimization of a nanotechnology based antimicrobial platform for food safety applications using Engineered Water Nanostructures," (EWNS), *Sci. Rep* 6, 21073 (2016) (hereinafter the Pyrgiotakis article), tests were performed on *E. Coli* bacteria using a flow rate limited diode style atomizer operating in the emission limited regime. The Pyrgiotakis article obtained a lethality rate of 4-log on *E. Coli* bacteria in about 45 minutes. A 4-log kill reduces a colony of one million bacteria to 100 bacteria, e.g., a 99.99% reduction.

In recent testing, charge injected atomizers operating with (K<1) distilled water sprays, were capable of destroying *E. Coli* bacteria with the same lethality rate (4-log) as reported in the Pyrgiotakis article in much shorter time scales (<60 seconds). In the testing, approximately one minute exposure tests produced the same lethality rate as the 45 minute tests described in the Pyrgiotakis article. In some tests of the charge injected atomizers, *E. Coli* bacteria was reduced approximately 10,000-fold by brief exposure (approximately 30 seconds) to the charged water droplet sprays.

Lethality of the charge injected atomizers is attributed to generating droplets in the Rayleigh regime (K<1) having energetic 4 Ry droplet surface charges. Each droplet surface charge in the Rayleigh regime has approximately 54 eV of energy or 4 Ry. The transfer of these 4 Ry electrons to the bacterium are probably instantaneously lethal. The inherent energy of each electron is well over an order of magnitude larger than the metabolic process (2 to 3 eV) of *E. Coli. The* 4 Ry charge, equivalent to 54.4 eV, unleashed on the bacterium is most assuredly lethal. The approximately million charges ($N_e=d/a_0$) delivered by each 50 μm droplet can effectively disrupt biological processes of the *E. Coli* bacterium.

The charge injection atomizers generating droplets in the Rayleigh regime (K<1) are thus lethal to the *E. Coli* bacterium, even over short exposure times of 60 seconds or less.

However, since the transference of charge produces the lethality rate, the process does not offer persistence over time.

The charge injected atomizer may also provide protection against significantly more complex biological entities, such as tick larva and less complex organisms, such as spores and viruses. In testing, a charged injection atomizer employed distilled water at an approximately 1 mL/sec flow rate with an approximately 1 μA amperage. The water droplets generated proved lethal to tick larvae. Operation with higher throughput and/or higher amperage may further reduce the exposure time required for disinfecting and sanitizing of surfaces.

Figure 9A:
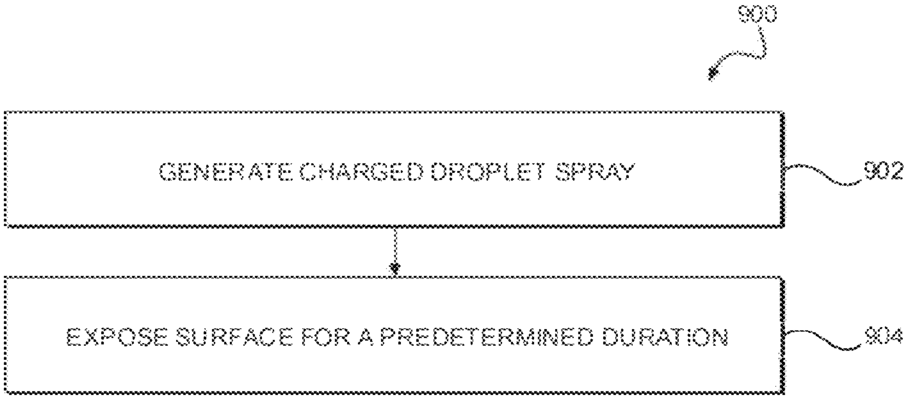
FIG. 9A illustrates an embodiment of a method to sanitize and/or disinfect a surface in accordance with embodiments of the invention.
Figure 9B:
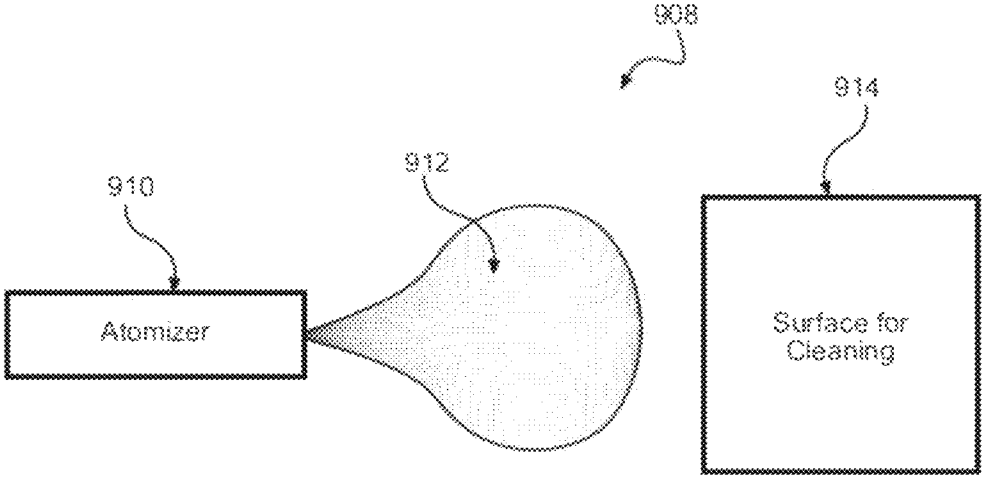
FIG. 9B illustrates an embodiment of a system to sanitize and/or disinfect a surface.

FIG. 9A illustrates an embodiment of a method 900 to sanitize and/or disinfect a surface 914 in accordance with embodiments of the invention, and FIG. 9B illustrates an embodiment of a system 908 to sanitize and/or disinfect a surface in accordance with embodiments of the invention. At step 902, a charge injection, electrostatic atomizer 910, (e.g., modified as in FIGS. 4-8 or unmodified as in FIGS. 1-3), operating in the Rayleigh regime K<1, generates a charged droplet spray 912, e.g., of distilled water or other cleaning fluid. For example, a droplet in the charged droplet spray 912 includes approximately 4 Ry droplet surface charges. At 904, a surface 914 is exposed to the charged droplet spray 912 for a predetermined duration. The duration may be 60 seconds or less for a 4-log lethality rate of *E. Coli* or more complex biological entities such as tick larvae. Thus, charged droplet sprays 912 generated by the electrostatic atomizer 910 are lethal both to more complex (tick larva) and less complex organisms (spores, viruses, and bacteria).

Embodiments of Desalinization

Desalination typically involves reverse osmosis technology and/or distillation to separate water molecules from seawater. In a reverse osmosis process, salt water, e.g., from the ocean, is forced through thousands of tightly wrapped, semipermeable membranes under extremely high pressure. The membranes allow the smaller water molecules to pass through, leaving salt and other impurities behind. However, the semipermeable membranes in this process require large surface areas that are exposed to pressure, heat, or a combination of the two. In distillation, selective boiling and condensation creates a separation of the water and the salt or other components. However, this distillation process consumes a large amount of energy to operate because the saltwater must be boiled at very high temperatures before it is potable. Thus, there is a need for an improved system and process for desalination.

Figure 10:
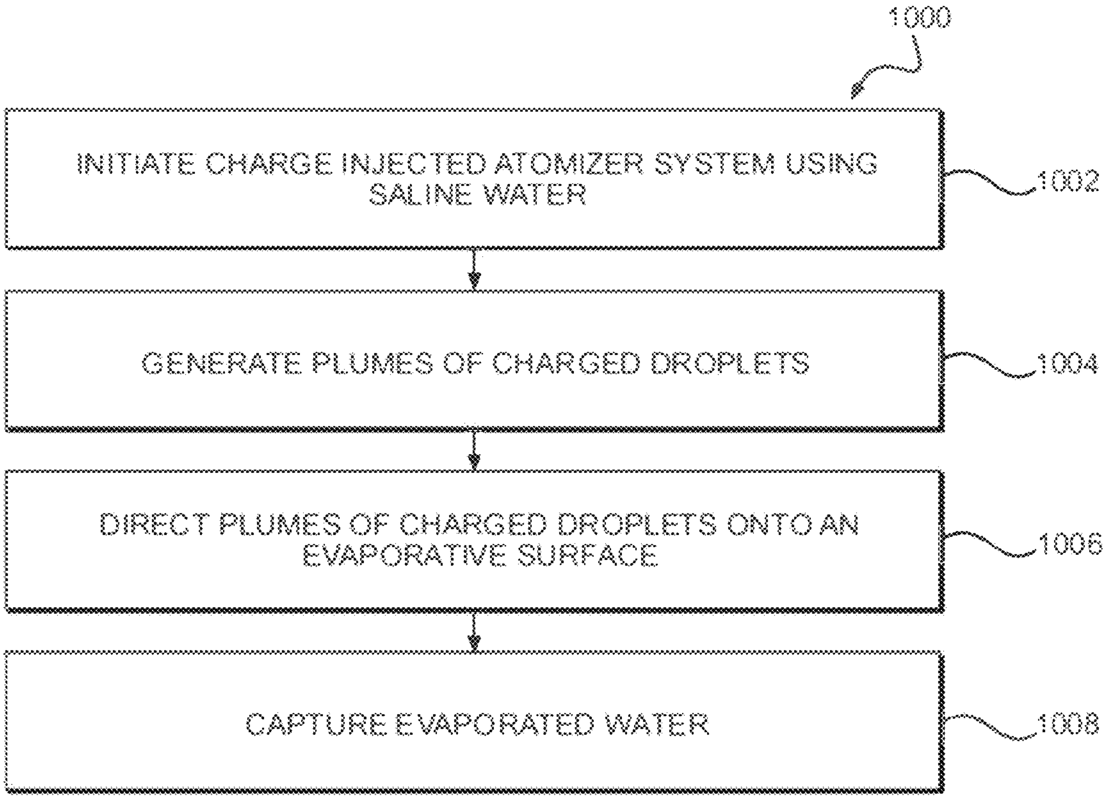
FIG. 10 illustrates a block flow diagram of a method for desalination using a modified charge injection, electrostatic atomizer in accordance with embodiments of the invention.

FIG. 10 illustrates a block flow diagram of a method 1000 for desalination using a modified charge injection, electrostatic atomizer 400 in accordance with embodiments of the invention. Though an electron gun atomizer or other type of atomizer may be used in this process, the charge injection, electrostatic atomizer 400 as described herein has increased efficiency with lower power requirements.

At step 1002, the electrostatic atomizer 400 is initiated or powered using saline water, such as ocean water. The electrostatic atomizer 400 converts the saline water into plumes of charged droplets at step 1004. The charged plumes are directed onto an evaporative surface in step 1006. Due to the self-dispersity of the charged plumes, the process separates the water and salt particulates at least to some extent on the evaporative surface. The separated water may then be collected as it evaporates from the surface in step 1008. The separated water and salt particulates may undergo further processing. For example, heat or pressure may be applied to the evaporative surface to further separate the water from the salt particulates and shorten the time to evaporate the water. Additional processing such as filtering or reverse osmosis processes may also be performed.

The charged plumes enhance evaporation such that the need for heating and pressure is reduced relative to traditional desalination methods. Electrostatic sprays, by virtue of their inherently high efficiency converting bulk fluids into high surface area droplets, provides a more direct means for desalinization. Charged plumes, in addition to having high dispersion that tends to vigorously separate into individual particles, also involve Rayleigh or Coulomb Busting. As charged droplets evaporate the charge is conserved until such time as the K=1 (surface tension and counteracting electrostatic force are equal) is reached. The droplet then explodes ejecting several smaller highly charged droplets and leaving a still charged "mother" droplet. This process of intense in situ atomization is repetitive until the complete disappearance of the droplet. Due to the self-dispersion of the charged plumes, the process assists in separating the water and salt particles more efficiently. The atomization may thus shorten the desalination process and/or increase efficiency of the desalination process.

Figure 11:
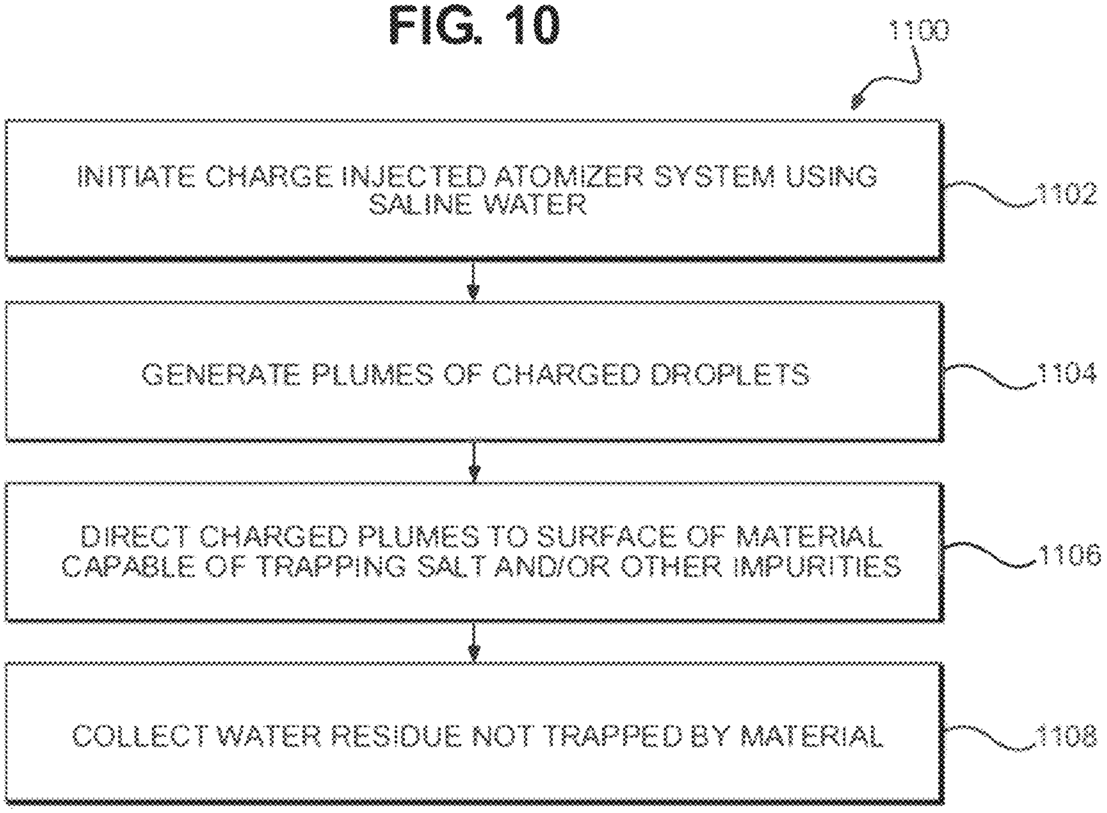
FIG. 11 illustrates a block flow diagram of another exemplary method for desalinization in accordance with embodiments of the invention.

FIG. 11 illustrates a block flow diagram of another exemplary method 1100 for desalinization in accordance with embodiments of the invention. Charge injection electrostatic atomization has been used to filter other liquids, such as the removal of micron and sub-micron-sized particulates from fuels and oils. See, e.g., U.S. Pat. No. 4,618,432, entitled, "Contaminated Fluid Charging", issued on Oct. 21, 1986 with inventor A. J. Kelly; U.S. Pat. No. 4,622,118, entitled, "Wax/Water Separations from Oil", issued on Nov. 11, 1986 with inventor A. J. Kelly; US Parent U.S. Pat. No. 4,622,119, entitled "Solute Nucleation", issued on Nov. 11, 1986 with inventor A. J. Kelly; U.S. Pat. No. 4,624,763, "Dispersed Phase Separation", issued Nov. 25, 1986 with inventor A. J. Kelly; U.S. Pat. No. 4,627,901, entitled, "Wax/Hydrocarbon Separations", issued on Dec. 9, 1986 with inventor A. J. Kelly; U.S. Pat. No. 4,629,546, entitled, "Dispersed Phase Separations", issued on Dec. 16, 1986 with inventor A. J. Kelly; U.S. Pat. No. 4,634,510, entitled, "Fluid Clarification", issued on Jan. 6, 1987 with inventor A. J. Kelly; U.S. Pat. No. 4,661,226, "Dispersed Phase Separation", issued on Apr. 28, 1987 with inventor A. J. Kelly; and U.S. Pat. No. 6,949,715, entitled, "Electrostatic Particle Size Separation", issued on Sep. 27, 2005 with inventor A. J. Kelly, all of which are hereby incorporated by reference herein. For example, in U.S. Pat. No. 6,949,715 referenced above, a method is described for separating a stream of particles by size. An atomizer generates a net charge to a plurality of particles including particles having different sizes so that each particle has a charge to mass ratio depending upon the size of the particle, whereby the charged particles create a self-field and mutually repel one another. The charged particles disperse solely under the influence of the self-field and mutual repulsion and collect on a collector having a conductive surface. However, this technology has never been applied to water desalination treatment.

In this embodiment, a material (such as an inexpensive recyclable material) is employed that is capable of sequestering salt as micron sized particulates. These particulates are removed from the saline water by having the charged spray impact the surface of the material. The salt particulates are welded or otherwise attached to the surface of the material. The salt particulates are thus separated from the water and may be collected and removed leaving salt-free water as a residue.

Referring to FIG. 11, the modified electrostatic atomizer 400 is initiated or powered using saline water, such as ocean water at step 1102. Though an electron gun atomizer or other type of atomizer may be used in this process, the modified electrostatic atomizer 400 as described herein has increased efficiency with lower power requirements. The modified electrostatic atomizer 400 converts the saline water into plumes of charged droplets at step 1104. At step 1106, the charged droplet plume is directed at a surface of a material capable of sequestering, trapping, and/or attracting salt as micron sized particulates. Upon impact, the salt particulates are welded or attached to the surface of the material. The water residue not trapped by the material is then collected at step 1108. Additional processing such as filtering or reverse osmosis processes may also be performed. This process with the modified electrostatic atomizer 400 may thus shorten the desalination process and/or increase efficiency of the desalination process.

Embodiments of Water Filtration/Purification

A variety of processes have been developed to remove particulate matter from bulk hydrocarbon liquids using charged sprays generated by an atomizer. A large variety of micron and sub-micron particulate materials (metals, soot, alumina, Arizona road dust, etc.) have been effectively removed from charged spray droplets. The same fundamental separation processes hold for water. For example, viruses and bacteria may be removed from contaminated water. High quality deionized water has a conductivity of about 5.5 μS/m at 25° C., typical drinking water has a conductivity in a range of 5-50 mS/m, while sea water has a conductivity of about 5 S/m (or 5,000,000 μS/m). A modified electrostatic atomizer 400 may generate a charged spray from these types of water to remove particulate matter from water.

Embodiments of Electrostatic Atomization for Various Values of K

In one or more embodiments, electrostatic atomization enables the electronic control of fuel droplet size and dispersion. For operation wherein the K factor is less than or equal to one K≤1, liquid droplet diameter is independent of all fluid properties (conductivity, density, viscosity, temperature), background conditions (pressure, temperature, humidity), and fluid dynamic effects such as fluid velocity and flow rate. The mean droplet size is determined solely by the free charge density ($\rho$, C/$m^3$) imparted to the fluent material. As described above, the droplet diameter d is related to the number of surface charges $N_e$ and the first Bohr radius $a_0$. Numerically, the droplet diameter d is related to the charge density $\rho$ (C/$m^3$) by the following relation:

$$d(\mu\text{m}) = 76/\sqrt{\rho}.$$

Unlimited quantities of charged droplets having precisely determined diameters can thus be generated by submerging an electron source in the fluid to be atomized. For instance, when an atomizer device having a charge particle emitter is situated immediately upstream of an aperture through which the fluid emerges, the atomizer (such as the Spray Triode Atomizer® and the atomizer described herein with respect to FIGS. 4-8) is essentially a Van de Graaff generator. The fluent material passing over the charge emitter is the charge conveyor belt.

An electron gun can be substituted as the emitter as described in U.S. Pat. No. 5,378,957, A. J. Kelly, "Electron Beam Dispersal Method", Jan. 3, 1995; U.S. Pat. No. 5,391,958, A. J. Kelly, "Electron Beam Window Devices", Feb. 21, 1995; and U.S. Pat. No. 5,478,266, A. J. Kelly, "Beam Window Devices", Dec. 26, 1995, which are hereby are incorporated by reference herein. These embodiments, and the embodiments described with respect to FIGS. 4-8 herein, are capable of producing charged sprays having values of K≥0. The behavior of such charged sprays is distinctly different depending on whether the spray K factor is smaller or larger than one, that is whether the spray is surface tension limited (K≤1, Rayleigh regime), or is emission electric field limited (K≥1).

Independent of the process for generation of charged sprays, certain fundamental principles apply. These principles, originally discovered to be applicable to all charged sprays, are applicable to both liquids and solids. Charged liquid droplets are dominated by surface tension (the Rayleigh regime) or by the droplet surface electric field (the emission-limited regime). As defined herein, both regimes are also manifest in solid particulate charging. For liquids, surface energy is fully defined by surface tension. Solid particles can be considered to have unlimited surface tension by comparison.

Traditionally, the Rayleigh regime, has been defined in terms of surface tension. However, it can also be equivalently defined in terms of the K factor. The surface energy $W_s$ is the surface tension responsible for maintaining the minimum energy spherical shape of the droplet. In the Rayleigh regime, K is less than or equal to 1 (K≤1); surface charge energy $W_e$ is less than or equal to the surface tension energy $W_s$.

When the K factor is unity (K=1), as occurs with charged droplet evaporation (surface charge does not evaporate), the electrostatic energy ($W_e$) and the surface tension energy ($W_s$) are equal, and the droplet explosively disrupts (Rayleigh/Coulomb bursting). Several smaller highly charged droplets are ejected from the now smaller, "mother" droplet with K<1. When K≥1, outwardly directed surface charge electric field $E_s$ rather than surface tension, or surface energy, becomes the dominant, controlling factor limiting charging.

When K≤1, the surface charge is characterized by being in a crystalline state. That is, the electrons are localized and are prevented from migrating on the surface. This is true for spherical droplets and for filaments, liquids and solids. The surface charge density defined by K<1 is compatible with the charge crystalline state independent of whether the surface is fluid or solid.

At the K=1 boundary, the crystalline cage structure melts; zero-point energy overcomes the strength of the crystalline charge cage structure. Droplet surface charges in the emission-limited regime (K≥1) become a liquid or gas and are free to skitter around the surface. The surface charges in the Rayleigh regime (K≤1) is a new state of matter, a spherical Fermionic crystal. The crystalline structure formed by these surface charges melt at the K=1 boundary and behave like a liquid or gas in the emission limited regime (K≥1). When K≤1 liquid droplets are sufficiently small so that surface tension forces dominate. This is generally true for solid particulates, which resist fracturing by electrostatic forces. When K≥1 droplet charging is dominated by the droplet surface electric field $E_s$ as defined above.

Rayleigh regime and emission-limited charged sprays are fundamentally different. In the surface tension dominated Rayleigh regime (K≤1), each surface electron is exceptionally energetic (droplet surface charge $-\alpha'/\beta'=4$ Ry, where 1 Ry=13.6 eV). Whereas, in the electrostatically dominated (K≥1) regime the droplet charge energy is at best a half, and most probably a quarter, of this level. This regime is characterized by melting of the Rayleigh limit surface electron crystal. The two electrostatic spray regimes, e.g., the surface tension dominated, Rayleigh regime (K≤1) and the emission-limited regime (K≥1), represent two distinct aspects of droplet surface charge collective behavior. The first clue to the nature of these states is the prediction that droplet charging undergoes a first order charging phase transition at the K=1 boundary. (cf. A. J. Kelly, "Low Charge Density Electrostatic Atomization," IEEE Industry Applications, 1-A, 20, pp. 267-273, 1984).

Figure 12:
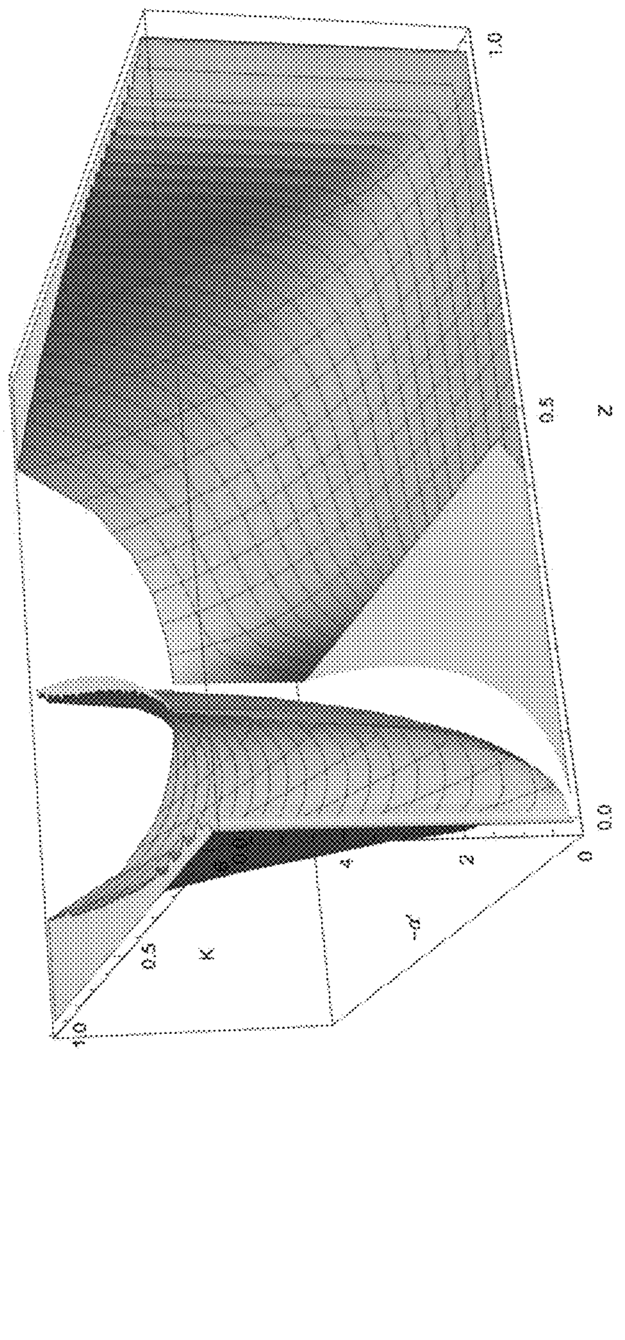
FIG. 12 illustrates a graphical representations of a spray morphology in accordance with embodiments of the invention.
Figure 13:
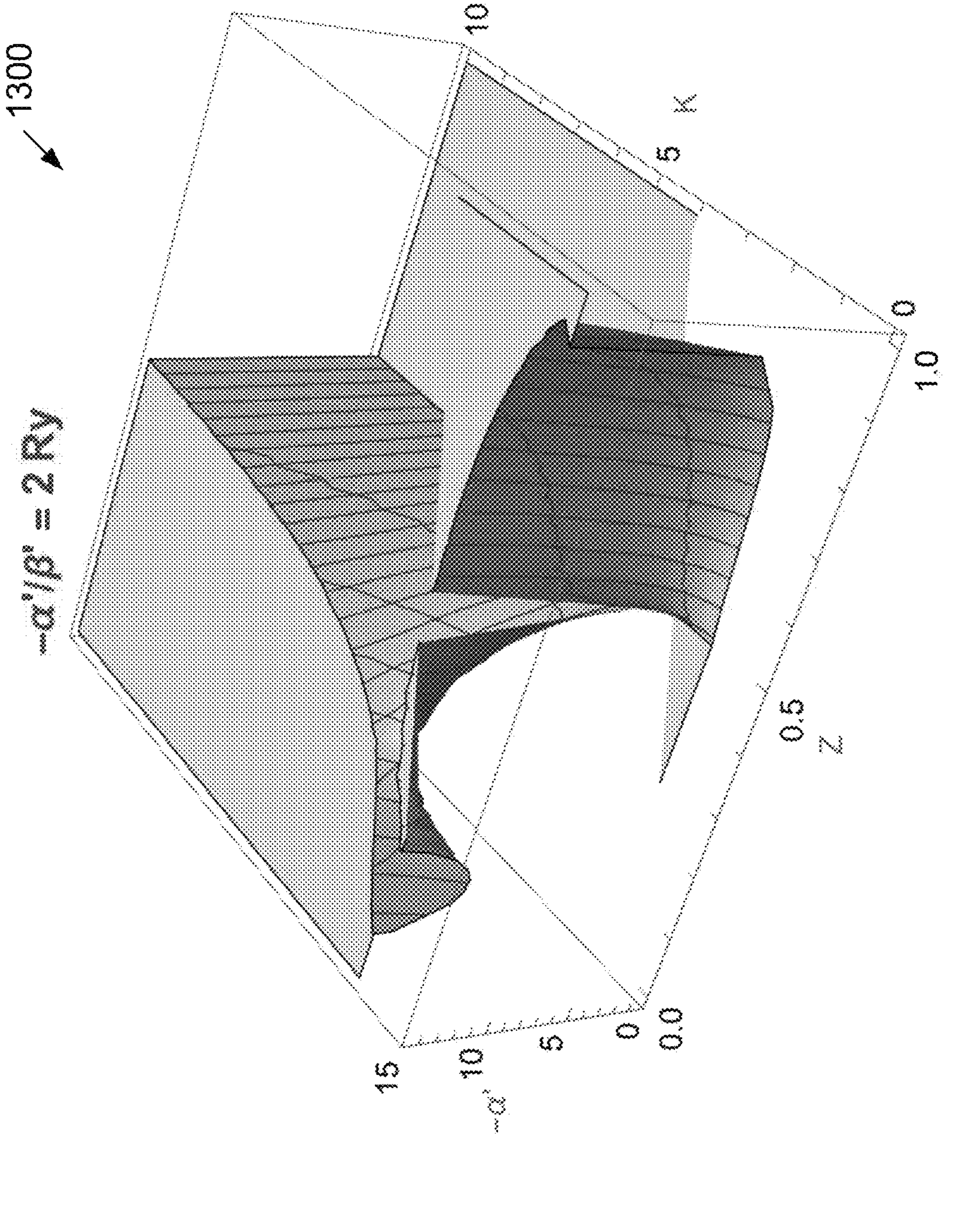
FIG. 13 illustrates a graphical representations of another spray morphology in accordance with embodiments of the invention.

FIGS. 12 and 13 illustrate graphical representations of spray morphologies. As illustrated by FIGS. 12 and 13, the spray morphology in the Rayleigh and emission-limited regimes are fundamentally different. As noted, in the surface tension dominated, Rayleigh regime (K≤1), each surface electron is exceptionally energetic (4 Ry). Whereas, in the electrostatically dominated, emission limited (K≥1) regime the droplet charge energy is at best a half, and most probably a quarter of this level.

In the graph of FIG. 12, the surface tension dominated Rayleigh regime K≤1 is illustrated. The droplet surface charge $W_s$ ($W_s$-$\alpha'/\beta'$) is 4 Ry, where $-\alpha'$ and $\beta'$ are the Langrangian Multipliers representing respectively the conservation of charge, and energy in the description of the most probable, the equilibrium, spray state. In FIG. 13, electrostatically dominated, emission limited regime K>1 is illustrated. The droplet surface charge $W_s=-\alpha'/\beta'$ equals 2 Ry. In both graphs, the X-axis illustrates the relative charging level which is limited to the range between 0 and 1 (0≤Z≤1). The Z parameter is the ratio of droplet charging normalized by the limiting charging level for the two spray regimes—the Rayleigh limit for K≤1 and the emission limit for K≥1. The Y-axis represents the charge conservation Lagrangian Multiplier $-\alpha'$. The Z-axis represents the K factor. As noted, in the surface tension dominated, Rayleigh regime (K<1), each surface electron is exceptionally energetic (4 Ry). Whereas, in the electrostatically dominated, emission limited (K>1) regime the droplet charge energy is at best a half, and most probably a quarter of this level.

These graphs show how the charging level Z, the fraction of the limiting charge level (Rayleigh or Emission), is related to the droplet surface charge $-\alpha'$ (for a fixed $-\alpha'/\beta'$) and K. In the Rayleigh regime, the droplet spray size distribution is inherently trimodal. Multimodality is most pronounced when ~0.2≤K≤1. For sprays with K less than approximately 0.2 (K<~0.2), the spray is energetically constrained to monodisperse behavior described by the above equation for droplet diameter $d=N_e a_0$. This is the so-called "asymptotic" realm where energy considerations restrain the spray to the low charging level Z trough of FIG. 12. The high charging level Z, almost fully charged, droplet branch is not observed. Observationally, the sprays are monodisperse.

As shown in FIG. 13, polydisperse behavior extends into the emission limited regime (K>1). When K is greater than or equal to approximately 2 (K≥2), the spray becomes monodisperse. For values of $-\alpha'$ (and $-\alpha'/\beta'$), the charging level Z is less than or equal to 0.5 (Z≤0.5) of the emission limit when K is greater than approximately 2 (K>~2).

Figure 14:
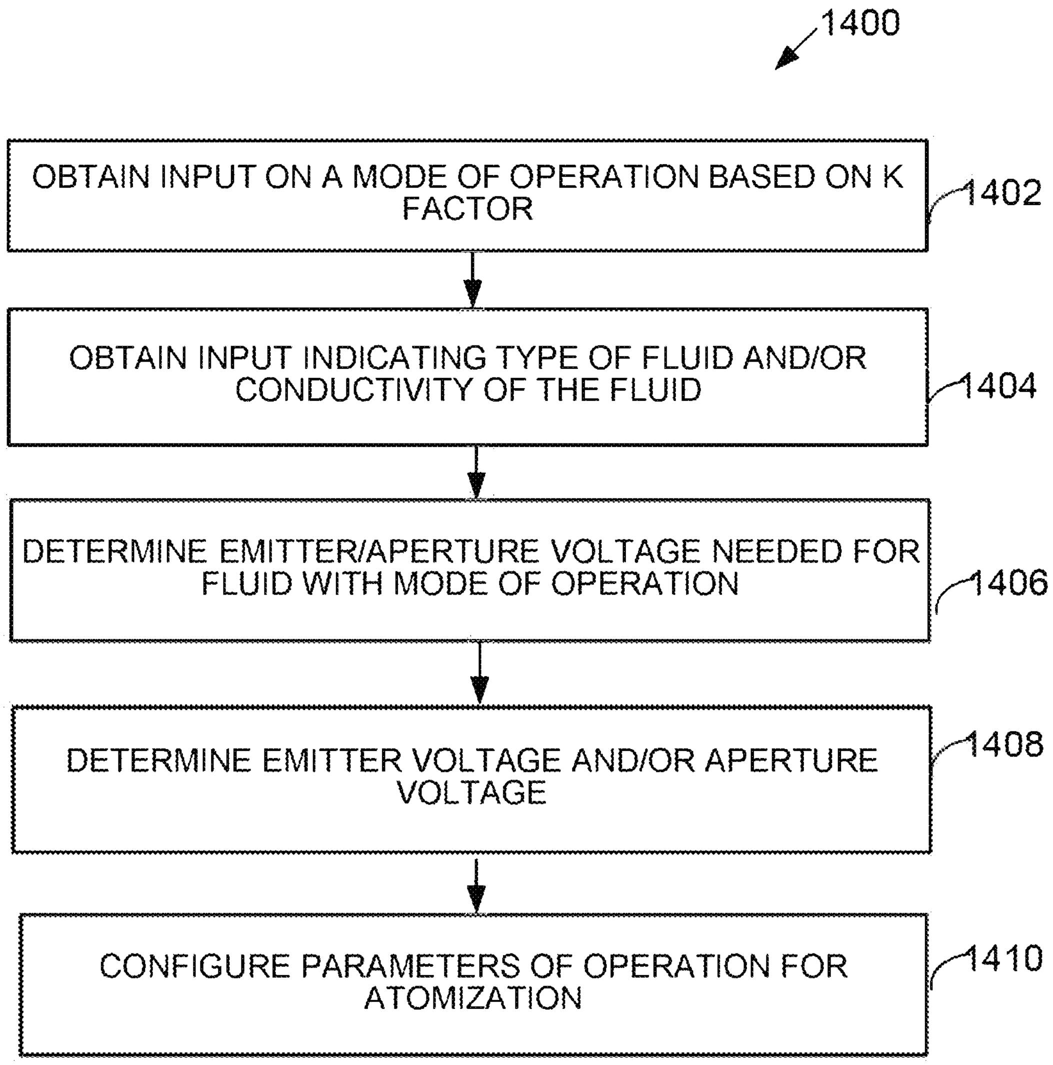
FIG. 14 illustrates a flow diagram of an exemplary embodiment of a method for configuration of the charge injection, electrostatic atomizer in accordance with embodiments of the invention.

FIG. 14 illustrates a flow diagram of an exemplary embodiment of a method 1400 for configuration of the system 500. In one or more embodiments described herein, a modified charge injection, electrostatic atomizer is described that efficiently atomizes fluids at a selected value of the K factor, wherein the K factor is greater than 0, e.g., a non-zero positive K factor. For example, it may be desirable to operate in the Rayleigh regime (0<K<1) when using the electrostatic atomizer for sanitizing a surface. Lethality of the charge injected atomizer is attributed to generating droplets in the Rayleigh regime (K<1) having energetic 4 Ry droplet surface charges. In another example, when a monodisperse spray is desired, it may be desirable to operate at a K factor greater than or equal to 2 wherein the electrostatic atomizer generates a monodisperse spray of droplets and/or particulates.

The 1400 method starts at step 1402 by obtaining user input indicating a mode of operation of the charge injected atomizer. In one example, a user selects the mode of operation by selecting a predetermined value for the K factor, wherein the K factor is greater than 0. In another example, the mode of operation is selected from predetermined ranges of K factor values, such the ranges of 0<K<1 and/or the range 1≤K≤2 and/or the range K>2. In yet another example, the mode of operation is selected functionally, such as "Mono-Disperse Spray" that means operating at K≥2 or the mode "Sanitizing" that means operating at K>1. In yet another example, the mode of operation selected indicates a droplet diameter.

At step 1404, the system 500 obtains user input indicating the type of fluid and/or the conductivity of the fluid. In one example, the user inputs a range of conductivities of the fluid, such as equal to or less than 1 μS/m or above 1 μS/m. In another example, the selection may be more exact, such as a manual input of an approximate conductivity of the fluid. In another example, the type of fluid is input or a selection of various fluids is presented with predetermined conductivities. In another embodiment, the system 500 may include a conductivity sensor that determines an approximate conductivity of the fluid. For example, the conductivity sensor may be implemented in the pressurized reservoir 502 or in the chamber 404 of the atomizer 400 and be configured to measure the conductivity of the fluid prior to charging the emitter 402. In another example, the system 500 determines an approximate conductivity or a range of conductivity of the fluid from the indicated type of fluid.

At step 1406, the system 500 determines the emitter to chamber/aperture voltage ($V_a$-$V_b$) range such that the system 500 generates the selected mode of operation and/or droplet diameter for the indicated type of fluid or fluid conductivity. At 1408, the voltage of the emitter $V_a$ and/or the voltage of the chamber/aperture $V_b$ are determined to achieve the determined emitter to chamber/aperture voltage ($V_a$-$V_b$). For example, the emitter voltage $V_a$ can be set to operate within a first predetermined voltage range while the chamber/aperture voltage $V_b$ can be set to operate in a second predetermined voltage range, such that the emitter to chamber/aperture voltage $V_a$-$V_b$ is maintained at a minimum voltage threshold or within a predetermined voltage range. The parameters of operation of the atomizer system 500 are then configured at 1410. The configuration can be performed automatically by the atomizer system 500 based on the user input. In another embodiment, the parameters of operation of the atomizer system 500 are configured manually. The voltage controller can thus adjust the emitter voltage $V_a$ and/or the aperture voltage $V_b$ to generate the plurality of droplets and/or particulates in the charged spray having a predetermined K factor, or a predetermined ranges of K factor values.

Figure 15:
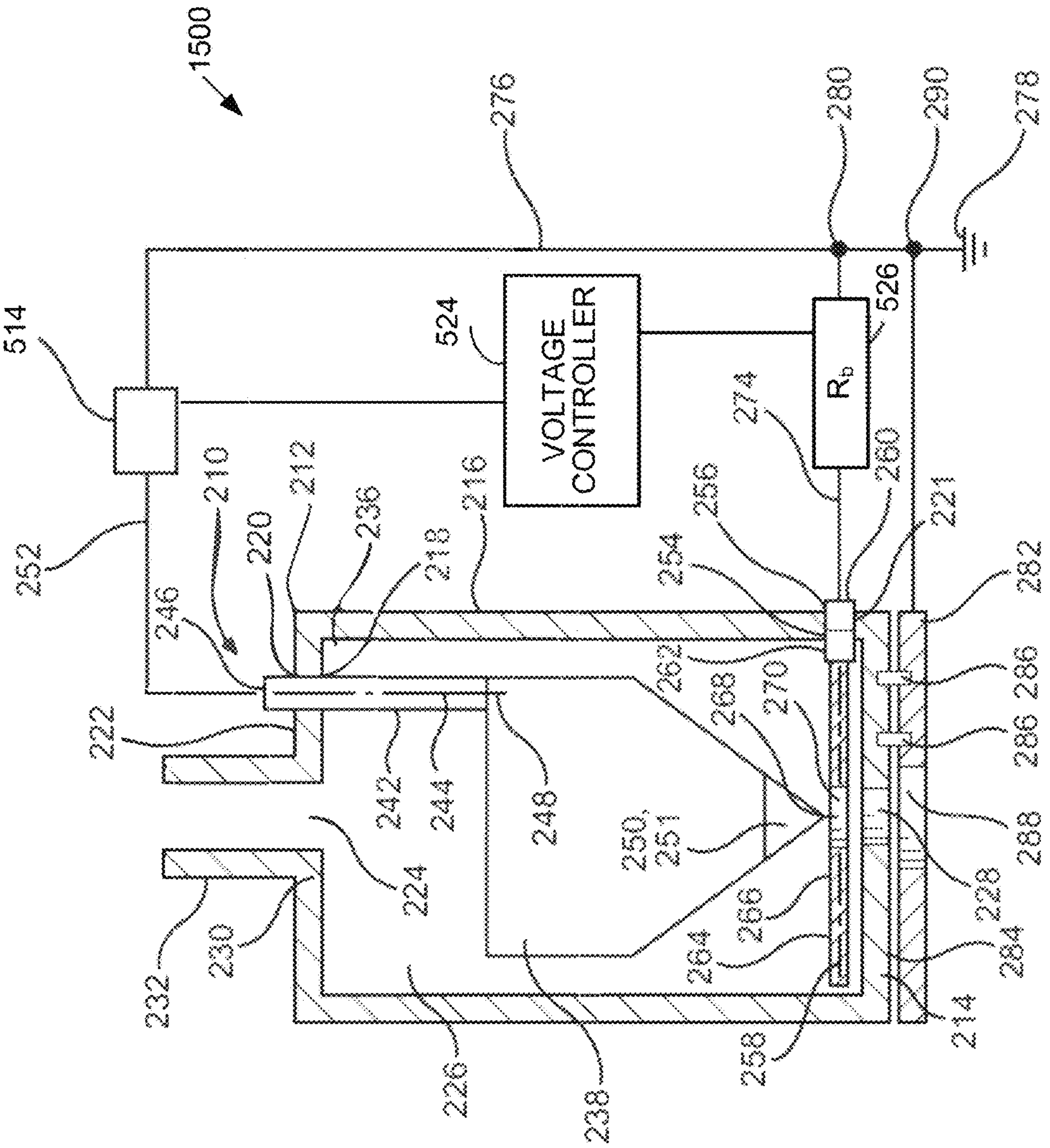
FIG. 15 illustrates a schematic block diagram of another embodiment of an exemplary modified charge injection, electrostatic atomizer in more detail.

FIG. 15 illustrates a schematic block diagram of another embodiment of an exemplary modified charge injection, electrostatic atomizer 1500 in more detail. This atomizer 1500 is similar to the atomizer described with respect to FIGS. 2-3, however in this example, rather than a resistor 272, a variable impedance circuit 524 is positioned in series to the second electrode 264 by an electrical lead wire 274 extending through tube 256. The variable impedance circuit 524 is connected at its opposite end to ground, such as the ground juncture 280 of the power supply 514. The power supply 514 may be a high voltage, regulated power supply or a variable power supply with adjustable output voltage and/or current. The voltage controller 524 is coupled to the variable impedance circuit 524 and in some embodiments, is also coupled to the power supply 514.

As in FIGS. 2-3, the first electrode 238 within the housing 212 can be moved longitudinally upwardly or downwardly thereby reducing or increasing the gap between the electrodes 238, 264 to modify the flow of charge within the liquid. In addition, the voltage controller 524 monitors the voltage of the first electrode $V_a$ and the voltage of the second electrode $V_b$. When the difference V-$V_b$ falls below a minimum voltage threshold $V_T$ or above a maximum voltage threshold $V_M$, the voltage controller 524 adjusts the first electrode voltage $V_a$ or the second electrode voltage $V_b$ or a combination thereof. For example, the voltage controller 524 may adjust the variable impedance circuit 526 to increase or decrease the impedance $R_b$ and thus, increase or decrease the second electrode voltage $V_b$. Additionally and/or alternatively, the voltage controller 524 increases or decreases the first electrode voltage $V_a$ (e.g., by increasing or decreasing the input current or voltage from the power supply 514).

In an embodiment, the voltage controller 524 is also coupled to monitor the voltage of the external electrode 282. The external electrode 282 is external to the aperture 228 of the housing 212 and physically separated from both the first electrode 238 and the second electrode 264. In an embodiment, the external electrode 282 is also connected to a grounded junction 290 disposed between ground 278 and the first electrical juncture 280 such that the external electrode 282 is at ground potential (0 V). The external electrode 282 is downstream from the aperture 228, such that when the fluid is emitted outwardly therefrom as a plurality of droplets, the external electrode 282 collects charges from at least a portion of the plurality of charged droplets and enhances acceleration of the charged droplets.

In one embodiment, the voltage controller 524 measures the first electrode voltage $V_a$ and the second electrode voltage $V_b$ in relation to the voltage $V_e$ of the external electrode 282. The voltage controller 524 may then adjust the second electrode voltage $V_b$, e.g., by adjusting the variable impedance circuit 526, with respect to the voltage $V_e$ of the external electrode 282. Additionally and/or alternatively, the voltage controller 524 adjusts the power supply 514 to the first electrode 238 to increase or decrease the first electrode voltage $V_a$ with respect to the voltage $V_e$ of the external electrode 282.

Figure 16:
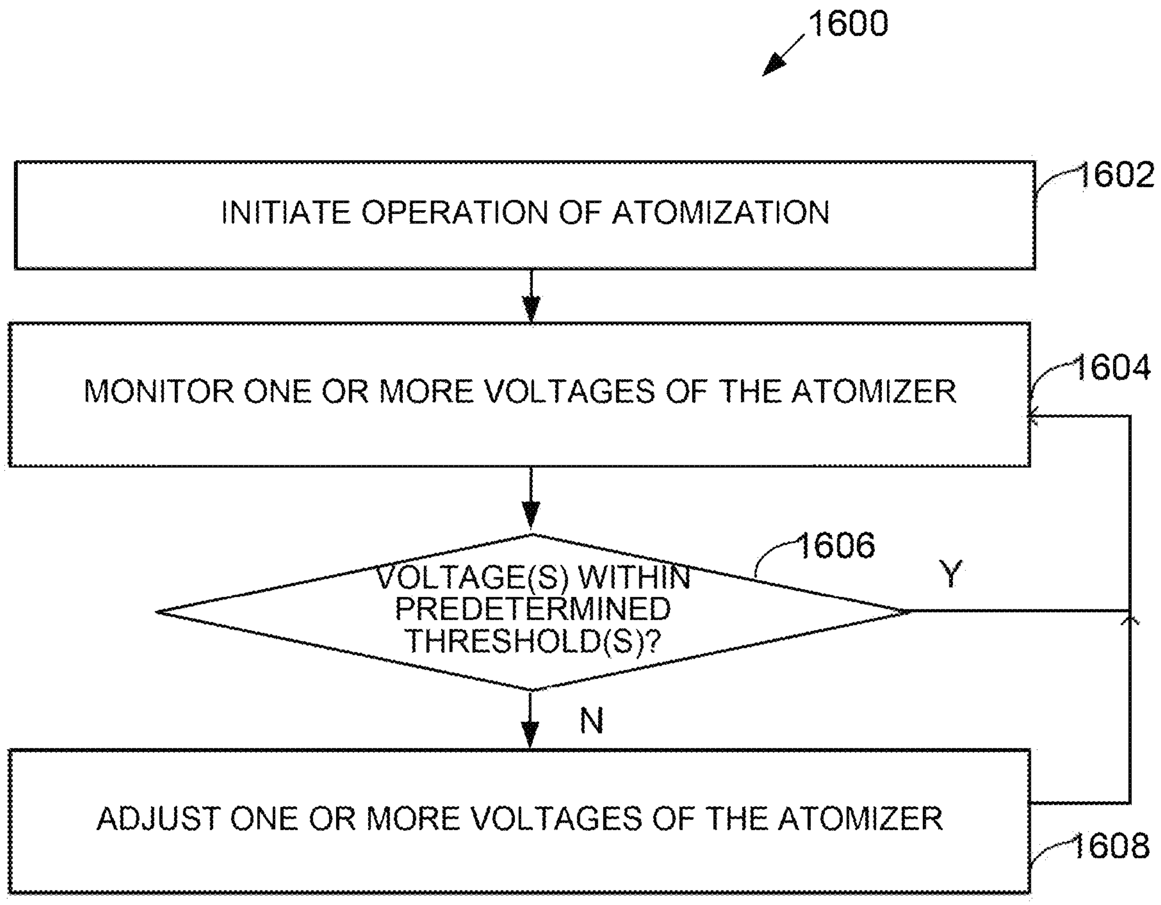
FIG. 16 illustrates a flow diagram of an exemplary embodiment of a method of operation of the exemplary modified charge injection, electrostatic atomizer in accordance with embodiments of the invention.

FIG. 16 illustrates a flow diagram of an exemplary embodiment of a method 1600 of operation of the atomizer 1500. Upon initiation of operation of the atomizer 1500 at 1602, one or more voltages of the atomizer 1500 is monitored at 1604. For example, the voltage controller 524 monitors one or more of: the first electrode voltage with respect to the external electrode voltage ($V_a$−$V_e$), the second electrode voltage $V_b$ with respect to the external electrode voltage ($V_b$−$V_e$), or the first electrode to second electrode voltage ($V_a$−$V_b$). Alternatively and/or additionally, the chamber/aperture voltage $V_b$ and the emitter voltage $V_a$ are monitored individually with respect to ground.

At 1606, the voltage controller 524 determines whether one or more of the voltages are not within set predetermined voltage thresholds or range. If not, the voltage controller 524 adjusts the first electrode voltage $V_a$ and/or the second electrode voltage $V_b$. For example, when the voltage ($V_a$−$V_b$) falls below a minimum voltage threshold $V_T$ or above a maximum voltage threshold $V_M$, the first electrode voltage $V_a$ or the second electrode voltage $V_b$ or a combination thereof may be adjusted. The power supply current $I_a$ may be increased or decreased to the emitter electrode 402 to increase or decrease the first electrode voltage $V_a$. Or the variable impedance circuit 526 may be adjusted to increase or decrease the second electrode voltage $V_b$. Or a combination of these actions may be performed. The monitoring of the voltages continues at 1604 during operation of the electrostatic atomizer 1500. The monitoring may be continuous or at periodic intervals.

The atomizer system described herein thus monitors and adjusts a voltage of the emitter $V_a$ and/or the voltage of a component (the chamber/aperture/second electrode) coupled to the chamber $V_b$ to maintain the voltage ($V_a$−$V_b$) at or above a minimum threshold $V_T$ or within a predetermined voltage range. Rather than $V_b$ equaling a small voltage (e.g., less than 10 V) or at ground as in prior charge injection atomizers, the modified atomizer described herein has an elevated voltage $V_b$. By maintaining the voltage ($V_a$−$V_b$), successful and efficient spray generation is possible of moderately to highly conductive fluids with a conductivity of 1 μS/m or more, as well as fluids with lower conductivity of less than 1 μS/m.

For example, the voltage $V_b$ may be equal to the leakage voltage $I_L$ times an impedance $R_b$ of an impedance circuit ($V_b$=$I_L$*$R_b$). The impedance circuit includes capacitance, inductance and/or resistance and may be implemented in series with the chamber/aperture/second electrode of the atomizer. The emitter/first electrode of the atomizer is charged to a first voltage $V_a$, such that the emitter to aperture voltage $V_a$−$V_b$ equals at least a minimum voltage threshold. For example, the minimum voltage may be set to approximately 400 V to produce droplets with 10 μm diameters or may be set to approximately 3300 V for droplets with 100 μm diameters. Though the voltage $V_b$ is described as the voltage at the aperture, at chamber walls, or at second electrode voltage, other elements of the atomizer in contact with the aperture may also be at the same voltage $V_b$, e.g., such as the chamber base. Thus, the voltage $V_b$ may be measured at different components coupled or connected to the chamber.

The atomizer may be operated at differing values of the K factor, wherein the K factor is greater than zero and is a ratio of electrostatic energy of surface charges ($W_e$) of the droplets in the plurality of charged droplets and surface energy ($W_s$) of the droplets in the plurality of charged droplets. The voltage controller can adjust the emitter/first electrode voltage $V_a$ and/or the aperture/chamber/second electrode voltage $V_b$ to generate the plurality of droplets and/or particulates in the charged spray having a predetermined K factor, or a predetermined ranges of K factor values.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled," "coupled to," "connected to" and/or "connecting" or "interconnecting" includes direct connection or link between nodes/devices and/or indirect connection between nodes/devices via an intervening item. As may further be used herein, inferred connections (i.e., where one element is connected to another element by inference) includes direct and indirect connection between two items in the same manner as "connected to." As may be used herein, the terms "substantially" and "approximately" provides an industry-accepted tolerance for its corresponding term and/or relativity between items.

Note that the aspects of the present disclosure may be described herein as a process that is depicted as a schematic, a flow chart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition, or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied, or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. A method by an electronic atomizer for electrostatically atomizing a fluent material, comprising:

monitoring one or more of: an emitter voltage $V_a$ of an emitter electrode in contact with fluent material in a chamber of the electrostatic atomizer, or an aperture voltage ($V_b$) of an aperture of the chamber of the electrostatic atomizer, or an emitter to aperture voltage ($V_a - V_b$);

determining one or more of: the emitter to aperture voltage ($V_a - V_b$), the emitter voltage ($V_a$), or the aperture voltage ($V_b$), are not within respective predetermined thresholds;

adjusting the emitter voltage $V_a$ and/or the aperture voltage $V_b$;

electrostatically atomizing the fluid into a charge spray, wherein the charged spray includes a plurality of charged droplets and/or particulates, wherein the plurality of the droplets and/or particulates in the charged spray are monodispersed corresponding to a K factor $K \leq 1$, and wherein the plurality of charged droplets and/or particulates form a spherical crystalline cage structure, and wherein a plurality of droplet diameters of the charged droplets and/or particulates are determined by an injected charge density.

2. The method of claim 1, wherein the crystalline cage structure melts when the K factor is K=1.

3. The method of claim 1 wherein the plurality of droplets and/or particulates in the charged spray are characterized by the K factor $0 < K \leq 1$, wherein the K factor is a ratio of electrostatic energy of surface charges ($W_e$) of the droplets in the plurality of charged droplets and the surface energy ($W_s$) of the droplets in the plurality of charged droplets.

4. The method of claim 1 wherein the K factor is a ratio of electrostatic energy of surface charges ($W_e$) of the droplets in the plurality of charged droplets and the surface energy ($W_s$) of the droplets in the plurality of charged droplets.

5. The method of claim 1, further comprising:

flowing the fluent material over the emitter electrode and through the aperture of the chamber; and using the emitter to aperture voltage ($V_a$–$V_b$) to insert charge into the fluent material as the fluent material flows over the emitter and through the aperture of the chamber and electrostatically atomizes into the charged spray.

6. The method of claim 1, further comprising:

adjusting the emitter voltage $V_a$ and/or the aperture voltage $V_b$ to generate the plurality of droplets and/or particulates in the charged spray having a predetermined value of the K factor K≤1, wherein the K factor is a ratio of electrostatic energy of surface charges ($W_e$) of the droplets in the plurality of charged droplets and surface energy ($W_s$) of the droplets in the plurality of charged droplets.

7. The method of claim 1, wherein adjusting the emitter voltage $V_a$ and/or the aperture voltage $V_b$ comprises one or more of:

adjusting a power supply to the emitter electrode to increase or decrease the emitter voltage $V_a$; or adjusting a variable impedance circuit to increase or decrease the aperture voltage $V_b$.

8. The method of claim 1, wherein $V_a$ and $V_b$ are measured in relation to a third electrode physically separated from both the emitter and the chamber.

9. The method of claim 8, wherein the third electrode is downstream and collects charges from at least a portion of the plurality of charged droplets.

10. The method of claim 9, wherein adjusting the emitter voltage $V_a$ and/or the aperture voltage $V_b$ comprises one or more of:

Adjusting a power supply to the emitter electrode to increase or decrease the emitter voltage $V_a$; or Adjusting a variable impedance circuit to increase or decrease the aperture voltage $V_b$.

* * * * *